US012775488B2

(12) United States Patent
Zhou et al.

(10) Patent No.: US 12,775,488 B2
(45) Date of Patent: Oct. 27, 2026

(54) METHOD, APPARATUS, AND SYSTEM FOR MULTI-MODAL MULTI-TASK PROCESSING

(71) Applicant: Alibaba Damo (Hangzhou) Technology Co., Ltd., Hangzhou (CN)

(72) Inventors: Chang Zhou, Beijing (CN); Jinze Bai, Beijing (CN); Peng Wang, Beijing (CN); An Yang, Beijing (CN); Junyang Lin, Beijing (CN); Hongxia Yang, Beijing (CN); Jingren Zhou, Hangzhou (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 659 days.

(21) Appl. No.: 18/332,989

(22) Filed: Jun. 12, 2023

(65) Prior Publication Data

US 2024/0004703 A1 Jan. 4, 2024

(30) Foreign Application Priority Data

Jun. 29, 2022 (CN) ......................... 202210746272.0

(51) Int. Cl.
*G06F 9/48* (2006.01)
*G06F 9/345* (2018.01)

(52) U.S. Cl.
CPC ............ *G06F 9/4881* (2013.01); *G06F 9/345* (2013.01)

(58) Field of Classification Search
None
See application file for complete search history.

(56) References Cited

U.S. PATENT DOCUMENTS

| | | | | |
|---|---|---|---|---|
| 10,733,813 | B2 * | 8/2020 | Ide | G06Q 10/1093 |
| 10,789,427 | B2 * | 9/2020 | Shazeer | G06N 3/0495 |
| 11,915,471 | B2 * | 2/2024 | Wolfe | G06V 30/194 |
| 11,966,927 | B2 * | 4/2024 | Xiao | G06N 3/084 |
| 12,073,305 | B2 * | 8/2024 | Amer | G06N 3/045 |
| 2020/0160559 | A1 | 5/2020 | Urtasun et al. | |

FOREIGN PATENT DOCUMENTS

| | | |
|---|---|---|
| CN | 110427627 A | 11/2019 |
| CN | 112119411 A | 12/2020 |

(Continued)

OTHER PUBLICATIONS

Wang et al. "Hierarchical Multimodal Fusion Network with Dynamic Multi-task Learning", 2021 IEEE, pp. 208-214.*

(Continued)

*Primary Examiner* — Van H Nguyen
(74) *Attorney, Agent, or Firm* — Finnegan, Henderson, Farabow, Garrett & Dunner, LLP

(57) ABSTRACT

A system for multi-modal multi-task processing includes a task representation component configured to determine a task representation element corresponding to a task representation framework that is used to define a content format for describing a to-be-processed task, and the task representation element including an element used to define task description information, an element used to define task input information, and an element used to define task output information; and based on the task representation element, acquire task description information, task input information, and task output information corresponding to each of to-be-processed tasks in different modalities; a data conversion component configured to determine an encoding sequence corresponding to each of the to-be-processed tasks; and a data processing component configured to process each of the to-be-processed tasks based on the encoding sequence corresponding to each of the to-be-processed tasks to obtain a task processing result corresponding to each of the to-be-processed tasks.

19 Claims, 10 Drawing Sheets

(56) References Cited

FOREIGN PATENT DOCUMENTS

| | | | |
|---|---|---|---|
| CN | 112183547 | A | 1/2021 |
| CN | 112800785 | A | 5/2021 |
| CN | 113240056 | A | 8/2021 |
| CN | 113792112 | A | 12/2021 |
| CN | 114631091 | A | 6/2022 |
| WO | WO 2018/213841 | A1 | 11/2018 |

OTHER PUBLICATIONS

European Patent Office Communication issued for Application No. 23181105.0 the Supplementary European Search Report (Art. 153(7) EPC) and the European search opinion dated Nov. 28, 2023, 15 pages.

Hu et al., "UniT: Multimodal Multitask Learning with a Unified Transformer," Facebook AI research (FAIR), 16 pages, 2021.

Lin et al., "M6: Multi-Modality-to-Multi-Modality-Multitask Mega-transformer for Unified Pretraining," KDD Virtual Event Singapore, 3251-3261, 2021.

First Search Report issued in corresponding Chinese Application No. 202210746272.0 on Aug. 11, 2022 (2 pages).

Supplemental Search Report issued in corresponding Chinese Application No. 202210746272.0 on Aug. 26, 2022 (1 page).

Office Action issued in corresponding Chinese Application No. 202210746272.0 on Aug. 18, 2022 (10 pages).

Wang et al., "OFA: Unifying Architectures, Tasks, and Modalities Through a Simple Sequence-to-Sequence Learning Framework," DAMO Academy, Alibaba Group, 26 pages, 2022.

* cited by examiner

METHOD, APPARATUS, AND SYSTEM FOR MULTI-MODAL MULTI-TASK PROCESSING

CROSS-REFERENCE TO RELATED APPLICATIONS

The disclosure claims the benefits of priority to Chinese Application No. 202210746272.0, filed on Jun. 29, 2022, which is incorporated herein by reference in its entirety.

TECHNICAL FIELD

The present application relates to data processing, and in particular to a method, an apparatus and a system for multi-modal multi-task processing.

BACKGROUND

Since the birth of artificial intelligence AI, it has received more and more attention, making the theory and technology increasingly mature and the application field expanding. However, the current AI technology mainly deals with simple tasks of single tasks, small tasks or similar tasks, and AI models are mainly obtained by training based on unimodal data. The AI models obtained in this way are usually weak in generalization ability and have difficulty with being applied to various complex application scenarios.

SUMMARY OF THE DISCLOSURE

Embodiments of the present disclosure provide a system for multi-modal multi-task processing. The system includes a task representation component having circuitry configured to determine a task representation element corresponding to a task representation framework, wherein the task representation framework is used to define a content format for describing a to-be-processed task, and the task representation element comprises: an element used to define task description information, an element used to define task input information, and an element used to define task output information; and based on the task representation element, acquire task description information, task input information, and task output information corresponding to each of a plurality of to-be-processed tasks in different modalities; a data conversion component, communicatively coupled to the task representation component, and having circuitry configured to determine an encoding sequence corresponding to each of the plurality of to-be-processed tasks; and a data processing component, communicatively coupled to the data conversion component, and having circuitry configured to process each of the plurality of to-be-processed tasks based on the encoding sequence corresponding to each of the plurality of to-be-processed tasks to obtain a task processing result corresponding to each of the plurality of to-be-processed tasks.

Embodiments of the present disclosure provide a method for multi-modal multi-task processing. The method includes determining a task representation element corresponding to a task representation framework, wherein the task representation framework is used to define a content format for describing a to-be-processed task, and the task representation element comprises: an element used to define task description information, an element used to define task input information, and an element used to define task output information; acquiring, based on the task representation element, the task description information, the task input information and the task output information corresponding to each of a plurality of to-be-processed tasks in different modalities; determining an encoding sequence corresponding to each of the plurality of to-be-processed tasks; and processing each of the plurality of to-be-processed tasks based on the encoding sequence corresponding to each of the plurality of to-be-processed tasks, to obtain a task processing result corresponding to each of the plurality of to-be-processed tasks.

Embodiments of the present disclosure provide an apparatus. The apparatus includes a memory configured to store instructions; and one or more processors configured to execute the instructions to cause the apparatus to perform operations for multi-modal multi-task processing. The operations include: determining a task representation element corresponding to a task representation framework, wherein the task representation framework is used to define a content format for describing a to-be-processed task, and the task representation element comprises: an element used to define task description information, an element used to define task input information, and an element used to define task output information; acquiring, based on the task representation element, the task description information, the task input information and the task output information corresponding to each of a plurality of to-be-processed tasks in different modalities; determining an encoding sequence corresponding to each of the plurality of to-be-processed tasks; and processing each of the plurality of to-be-processed tasks based on the encoding sequence corresponding to each of the plurality of to-be-processed tasks, to obtain a task processing result corresponding to each of the plurality of to-be-processed tasks.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

In the field of AI technology, AI technology is mainly capable of processing simple tasks of single tasks, small tasks, or similar tasks. For usual AI models, training samples are often organized mainly with unimodal data, that is, AI models of targets are mainly designed for single modality and for solving specific problems. Therefore, the AI models obtained from training are difficult to be extended into other modalities and other tasks, and the generalization ability is limited.

In order to solve the above technical problem, embodiments of the present disclosure provide a method, a device, and a system for multi-modal multi-task processing. The method for multi-modal multi-task processing can be executed by an apparatus for multi-modal multi-task processing, and the apparatus is communicatively coupled to a requester side/client side. In some embodiments, the apparatus for multi-modal multi-task processing may be implemented as a server in the cloud, and the method for multi-modal multi-task processing may be executed in the cloud. Several computing nodes (cloud servers) may be deployed in the cloud, and each computing node has processing resources for computation, storage, and the like. In the cloud, multiple computing nodes may be organized to provide certain services. In some embodiments, one computing node may provide one or more services. A service interface can be provided to external to provide the service by the cloud, and a user calls the service interface to use the corresponding service. The service interface includes a Software Development Kit (SDK), an Application Programming Interface (API) and the like.

The cloud may provide a service interface for multi-modal multi-task processing service, and the user calls the multi-modal multi-task processing service interface through the client side/requester side to trigger a request to the cloud to call the multi-modal multi-task processing service interface. The cloud determines a computing node that responds to the request, and utilizes processing resources in the computing node to perform a specific multi-modal and multi-task processing operation.

Figure 1:
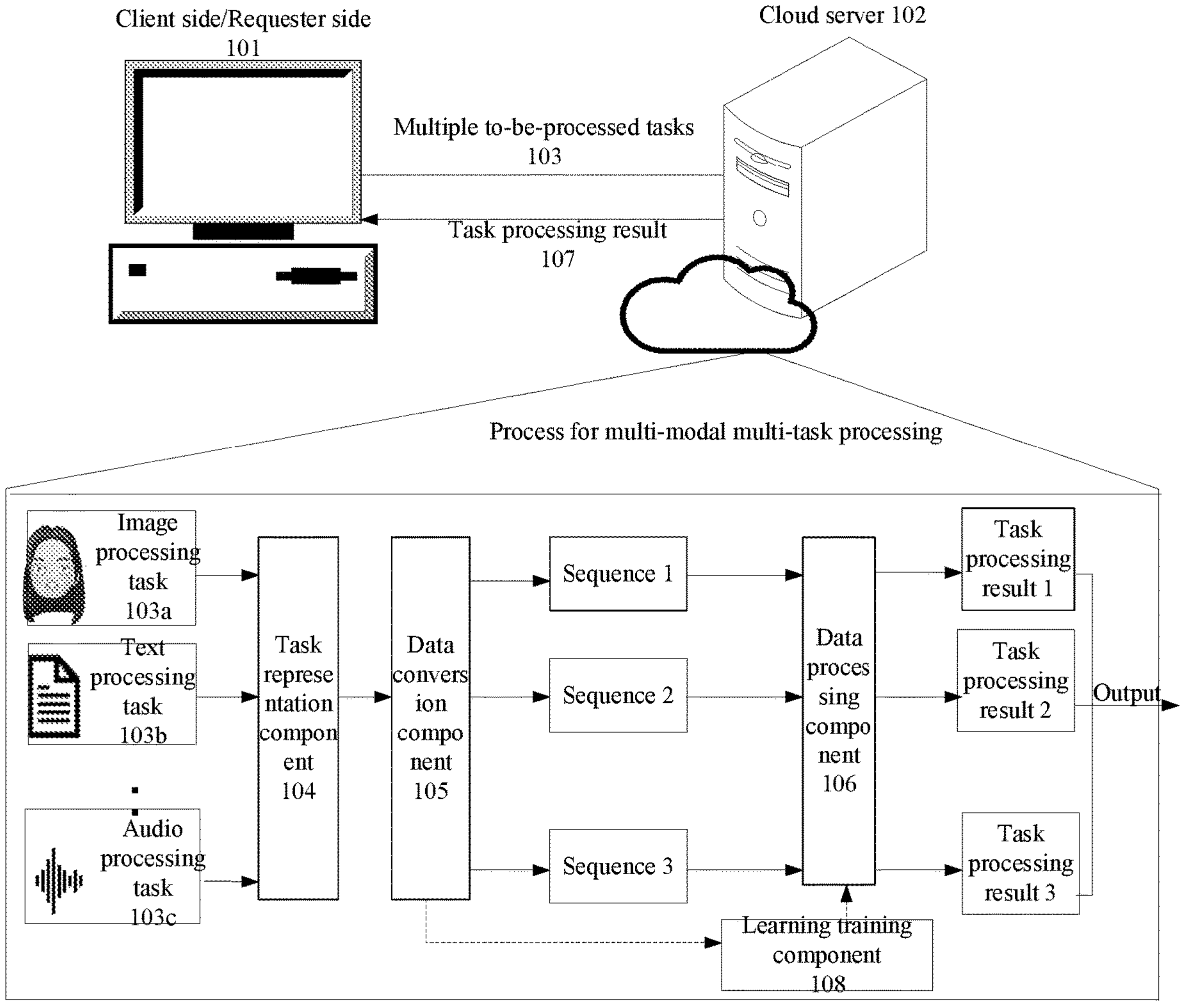
FIG. 1 is a schematic diagram of an example application scenario of a method for multi-modal multi-task processing, according to some embodiments of the present disclosure.

FIG. 1 is a schematic diagram of an example application scenario of a method for multi-modal multi-task processing, according to some embodiments of the present disclosure. As shown in FIG. 1, a client side/requester side 101 may be any computing device with a certain data transmission capability, and in some embodiments, client side/requester side 101 may be a cell phone, a personal computer PC, a tablet PC, a set application, and the like. A basic structure of client side 101 may include: at least one processor. The number of processors depends on the configuration and type of the client side. Client side 101 may also include a memory, which may be volatile, such as RAM, or non-volatile, such as Read-Only Memory (ROM), flash memory, or may include two types. An Operating System (OS) and one or more application programs may usually be stored in the memory, and program data may also be stored in the memory. In addition to a processing unit and a memory, client side 101 also includes some basic configurations, such as network card chips, IO bus, display components, and some peripheral devices. In some embodiments, the peripheral devices may include, for example, a keyboard, a mouse, a stylus, and a printer. Other peripheral devices are well known in the art and will not be described here.

An apparatus 102 for multi-modal multi-task processing refers to a device that may provide multi-modal multi-task processing. In terms of physical implementation, the apparatus for multi-modal multi-task processing may be any device for multi-modal multi-task processing that can provide computing services, respond to multi-modal multi-task services, and perform multi-modal multi-task processing, for example, it may be a cluster server, a conventional server, a server in the cloud, a cloud host, and a virtual center. An operation management device may include a processor, a hard disk, a memory, a system bus, and the like, and is similar to a general-purpose computer architecture.

In this example, client side/requester side 101 may be connected to apparatus 102 for multi-modal multi-task processing through a network, and the network connection may be a wireless or wired network connection. If client side/requester side 101 and apparatus 102 for multi-modal multi-task processing are communicatively coupled, a network standard of the mobile network may be any one of 2G (GSM), 2.5G (GPRS), 3G (WCDMA, TD-SCDMA, CDMA2000 and UTMS), 4G (LTE), 4G+(LTE+), WiMax, 5G, 6G, or the like.

In some embodiments, client side/requester side 101 may generate or acquire multiple to-be-processed tasks 103 in different modalities, and the multiple to-be-processed tasks 103 may include the task content of the multiple to-be-processed tasks. The specific implementations of acquiring multiple to-be-processed tasks in different modalities at the requester side does not limit in the present disclosure. In some embodiments, requester side 101 is configured with an interaction interface, execution operations input by the user on the interaction interface are acquired, and the multiple to-be-processed tasks 103 in different modalities may be acquired based on the execution operations. In some other examples, multiple to-be-processed tasks 103 in different modalities may be stored in a third device, the third device is communicatively coupled to requester side 101, and multiple to-be-processed tasks 103 in different modalities are acquired actively or passively by means of the third device. After the multiple to-be-processed tasks 103 in different modalities are acquired, the multiple to-be-processed tasks 103 in different modalities may be sent to the apparatus 102 for multi-modal multi-task processing, so that apparatus 102 for multi-modal multi-task processing may process each of the multiple to-be-processed tasks 103 based on the multiple to-be-processed tasks.

Apparatus 102 for multi-modal multi-task processing is configured to acquire multiple to-be-processed tasks 103 in different modalities sent by requester side 101. In some embodiments, a task representation component 104 is configured to acquire multiple to-be-processed tasks in different modalities through a task representation framework. For example, the multiple to-be-processed tasks may include an image processing task 103*a* (an image enhancement processing task, an image blurring processing task, an image recognition processing task, etc.), a text processing task 103*b* (a text editing task, a text recognition task, a text generation task, etc.), and an audio processing task 103*c* (an audio recognition task, and an audio conversion task). The abovementioned task representation framework is used to define a content format for describing the to-be-processed tasks, and the task representation framework may be a task representation framework of a seq2seq structure, a task representation framework of a decoder-only structure, or the like. The seq2seq structure is a network of an Encoder-Decoder structure, which has an input of a sequence, and an output of a sequence. An Encoder is used to convert a variable-length signal sequence into a fixed-length vector expression, and a Decoder is used to convert the fixed-length vector into a variable-length target signal sequence.

It is to be noted that the apparatus for multi-modal multi-task processing not only can process multiple to-be-processed tasks in different modalities simultaneously, but also can process one or more to-be-processed tasks in single modality. The apparatus for multi-modal multi-task processing not only can passively acquire multiple to-be-processed tasks and perform corresponding task processing operations on the multiple to-be-processed tasks, but also can actively process multiple to-be-processed tasks in different modalities, for example, regularly and actively acquire multiple to-be-processed tasks in different modalities according to a preset detection cycle, or actively acquire multiple to-be-processed tasks in different modalities in real time.

After the task representation component 104 acquires the multiple to-be-processed tasks 103 in different modalities through the task representation framework, a data conversion component 105 is configured to convert the multiple to-be-processed tasks 103 to determine an encoding sequence corresponding to each of the multiple to-be-processed tasks. For example, by processing an image processing task 103*a*, encoding sequence 1 corresponding to the image processing task 103*a* is obtained; by processing a text processing task 103*b*, encoding sequence 2 corresponding to the text processing task 103*b* is obtained; by processing an audio processing task 103*c*, encoding sequences 3 corresponding to the audio processing task 103*c* is obtained; then a data processing component 106 processes the multiple to-be-processed tasks based on the encoding sequence corresponding to each of the multiple to-be-processed tasks, to obtain a task processing result 107 (e.g., task processing result 1, task processing result 2, task processing result 3) corresponding to each of the multiple to-be-processed tasks 103.

In the embodiments of the present disclosure, task representation component acquires multiple to-be-processed tasks in different modalities through a task representation framework, where the task representation framework is used to define a content format for describing the to-be-processed tasks. A data conversion component determines an encoding sequence corresponding to each of the multiple to-be-processed tasks. Finally, a data processing component processes the multiple to-be-processed tasks based on the encoding sequence, to obtain a task processing result corresponding to each of the multiple to-be-processed tasks, so as to realize the processing of the multiple tasks in different modalities. Therefore, not only the effect of processing the multiple to-be-processed tasks is ensured, but also the difficulty of multi-modal multi-mask processing is reduced, so that the technical solution is applicable to various application scenarios.

In some embodiments, a learning training component 108 is further provided and configured to perform learning training on training samples.

Some embodiments of the present disclosure will be described in detail below with reference to the accompanying drawings. Provided that there is no conflict between the embodiments, the following embodiments and features in the embodiments can be combined with each other. In addition, the sequence of steps in the following method embodiments is only an example, not a strict limitation.

Figure 2:
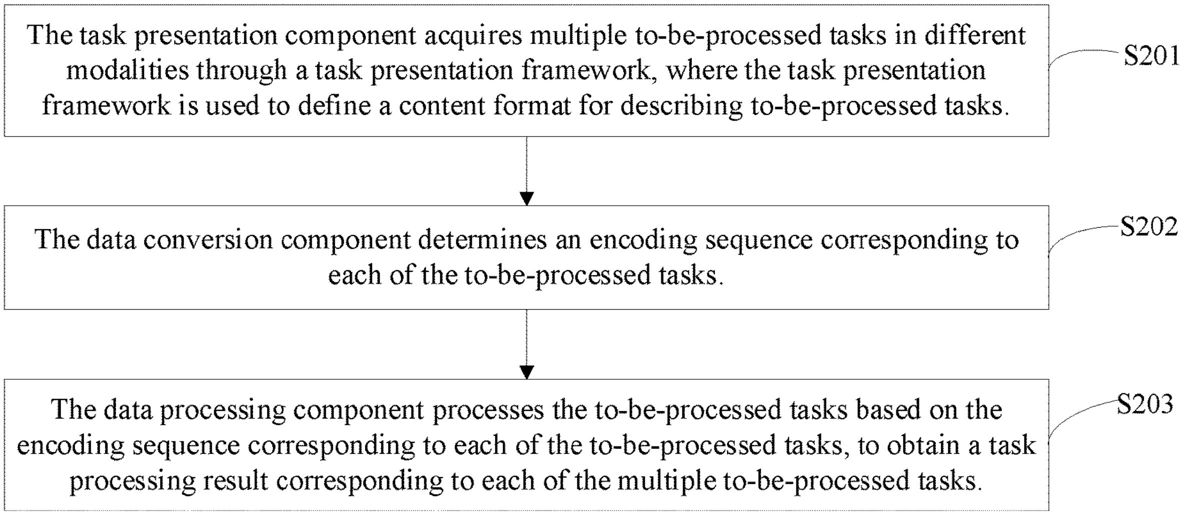
FIG. 2 is a schematic flow chart of an example method for multi-modal multi-task processing, according to some embodiments of the present disclosure.

FIG. 2 is a schematic flow chart of an example method for multi-modal multi-task processing, according to some embodiments of the present disclosure. With reference to FIG. 2, a method for multi-modal multi-task processing is provided, which is applied to a system for multi-modal multi-task processing. The processing system includes a task representation component, a data conversion component communicatively coupled to the task representation component, and a data processing component communicatively coupled to the data conversion component. The method may be executed by an apparatus for multi-modal multi-task processing. It is to be understood that the processing apparatus may be implemented as software, or a combination of software and hardware. In some embodiments, the method for multi-modal multi-task processing includes step S201 to S203.

At step S201, the task representation component acquires multiple to-be-processed tasks in different modalities through a task representation framework, where the task representation framework is used to define a content format for describing to-be-processed tasks.

At step S202, the data conversion component determines an encoding sequence corresponding to each of the to-be-processed tasks.

At step S203, the data processing component processes the to-be-processed tasks based on the encoding sequence corresponding to each of the to-be-processed tasks, to obtain a task processing result corresponding to each of the multiple to-be-processed tasks.

The method for multi-modal multi-task processing in this example is applied to a system for multi-modal multi-task processing. The system includes a task representation component, a data conversion component, and a data processing component. The task representation component is mainly configured to acquire multiple to-be-processed tasks in different modalities through a task representation framework, where the task representation framework is used to define a content format for describing to-be-processed tasks. The data conversion component is communicatively coupled to the task representation component, and is configured to determine an encoding sequence corresponding to each of the to-be-processed tasks. The data processing component is communicatively coupled to the data conversion component, and is configured to process the to-be-processed tasks based on the encoding sequence corresponding to each of the to-be-processed tasks, and obtain a task processing result corresponding to each of the multiple to-be-processed tasks.

The above steps will be described in detail below.

At step S201, the task representation component acquires multiple to-be-processed tasks in different modalities through a task representation framework, where the task representation framework is used to define a content format for describing to-be-processed tasks.

In some embodiments of the present disclosure, the task representation framework may be used to represent the content of various tasks in different modalities, and the task representation framework may be a task representation framework of a seq2seq structure, a task representation framework of a decoder-only structure, and the like. In some embodiments, the type of task representation framework is not limited to the ones described above, and those skilled in the art may also select other type of task representation framework according to specific application requirements and design requirements, which will not be repeated here.

When multiple tasks in different modalities need to be processed, the multiple to-be-processed tasks in different modalities may be acquired based on a unified task representation framework. Since the task representation framework is used to define the content format for describing to-be-processed tasks, the multiple to-be-processed tasks in different modalities being described in a uniform format is achieved. For example, based on a language description instruction, any task can be jointly described by a triple form of <task text description, *input, *output>, or any task can be jointly described by a quadruple form of <task text description, *input, *output, task processing precision>, and the like. It can be seen from the above that multiple to-be-processed tasks in different modalities can be obtained through the task representation framework, so that the multiple to-be-processed tasks in different modalities can be described in a unified content format.

In practical applications, there may be various tasks. In order to process all types of tasks uniformly, multiple to-be-processed tasks in different modalities can be acquired through the task representation framework. The task representation framework may be used in a generative manner to process various types of tasks that contain the input and output in different modalities. Data modalities corresponding to tasks in different modalities may include at least two of image, text, audio, graph, action, table, and the like. The multiple to-be-processed tasks may be: a text processing task, an image processing task, an audio processing task, a video processing task, and the like, which may be set according to actual specific application requirements.

At step S202, the data conversion component determines an encoding sequence corresponding to each of the to-be-processed tasks.

For multiple to-be-processed tasks in different modalities, although the task representation framework is used to achieve a unified description of the multiple to-be-processed tasks in different modalities, all the multiple tasks acquired by the apparatus for multi-modal and multi-task processing are expressed in the format of a text description. For the processing apparatus, it may not be able to directly identify and directly process the acquired multiple to-be-processed tasks. Moreover, due to the multiple tasks correspond to different data modalities, and the different data modalities correspond to different data processing methods, in order to accurately process the multiple to-be-processed tasks in different modalities, each of to-be-processed tasks may be subjected to an encoding processing, so that an encoding sequence corresponding to each of the multiple to-be-processed tasks can be determined.

In some examples, data conversion algorithms/rules for conversion of to-be-processed tasks in different modalities are pre-configured. After multiple to-be-processed tasks are acquired, a data conversion algorithm/rule corresponding to each of the to-be-processed tasks is determined based on a data modality corresponding to the to-be-processed task. The data conversion algorithm/rule corresponding to each of the to-be-processed tasks may be used to process each of to-be-processed tasks, to obtain an encoding sequence corresponding to each of the to-be-processed tasks.

In some other examples, the processing apparatus is pre-configured with multiple data conversion modules for processing all foreseeable-modal to-be-processed tasks, and the above-mentioned multiple data conversion modules are used to perform conversion processing on respective corresponding to-be-processed tasks, to determine an encoding sequence corresponding to each of the multiple to-be-processed tasks. In some embodiments, in order to ensure the quality and efficiency of converting each of to-be-processed tasks, the data conversion component may first acquire all data conversion modules capable of data conversion processing, determine a target data conversion module corresponding to each of the to-be-processed tasks among all of the data conversion modules, and then use the target data conversion module to convert the to-be-processed tasks, to determine the encoding sequence corresponding to each of the multiple to-be-processed tasks.

Different data conversion modules (or called 10 converters) may be used to convert to-be-processed tasks in different modal types. In some embodiments, the data conversion module can convert the original input task information into an intermediate result (i.e., an encoding sequence) that the apparatus for multi-modal multi-task processing can recognize and complete calculations. The data conversion module corresponding to each of the above tasks may be determined based on a data modality in the task. After multiple to-be-processed tasks are acquired, the data modality corresponding to each of the multiple to-be-processed tasks may be determined. A corresponding target conversion module is then called according to the data modality corresponding to each of the multiple to-be-processed tasks. Then the to-be-processed task is input to the corresponding target conversion module, so that an encoding sequence output by the target conversion module may be obtained.

It is to be noted that the modal types that can be supported by all the data conversion modules configured in this example may include text, image, audio, bounding box, graph, action, and the like. Moreover, the modal types can be dynamically added to all the pre-configured or historically configured data conversion modules according to actual application requirements, so that the data conversion modules can perform conversion on the to-be-processed tasks with the new added modal type. Moreover, the modal types can also be dynamically deleted from all the pre-configured or historically configured data conversion modules according to actual application requirements, that is, the dynamic setting of data conversion modules is realized, which improves the flexibility of using the method and helps to meet the various data processing requirements of different users.

At step S203, the data processing component processes the to-be-processed tasks based on the encoding sequence corresponding to each of the to-be-processed tasks, to obtain a task processing result corresponding to each of the multiple to-be-processed tasks.

After determining the encoding sequence corresponding to each of the multiple to-be-processed tasks, the data conversion component may process the multiple to-be-processed tasks based on the encoding sequences, to obtain a task processing result corresponding to each of the multiple to-be-processed tasks. In some embodiments, obtaining a task processing result corresponding to each of the multiple to-be-processed tasks may include: the processing apparatus is configured with a sub-model used for analyzing and processing to-be-processed tasks in each modality, and the encoding sequence corresponding to each of the determined to-be-processed tasks is processed by means of the sub-model, to obtain a task processing result corresponding to each of the multiple to-be-processed tasks. Those skilled in the art may also use other methods to process the multiple to-be-processed tasks based on the encoding sequences, as long as the accuracy and reliability of the task processing results can be guaranteed, which will not be repeated here.

It is to be noted that for a user, when there is a task processing requirement, the user only cares about the task processing result and not the process of the task processing. As for the processing apparatus, when the processing apparatus analyzes and processes the corresponding to-be-processed task based on the encoding sequence, the encoding sequence corresponding to the task processing result is obtained directly, that is, the task processing result that can be recognized by the computer, while the user cannot directly parse the above-mentioned encoding sequence. In this case, in order to enable the user to intuitively obtain the task processing result, the encoding sequence corresponding to the task processing result can be converted to obtain the task processing result meeting the user's needs and being convenient for the user to view. Meeting the user's needs may mainly include: an output data modality of the task processing result meeting the user's preset modality, a data type corresponding to the task processing result meeting the user's preset data type, and the like.

The method for multi-modal multi-task processing provided in the embodiments of the present disclosure is applied to a system for multi-modal multi-task processing. The system includes a task representation component, a data conversion component communicatively coupled to the task representation component, and a data processing component communicatively coupled to the data conversion component. Multiple to-be-processed tasks in different modalities are acquired through the task representation frame, that is, the multiple to-be-processed tasks in different modalities may be described by a unified task representation frame. The data conversion component determines an encoding sequence corresponding to each of the to-be-processed tasks. Then the data processing component processes each of to-be-processed tasks based on the encoding sequence, to obtain a task processing result corresponding to each of the multiple to-be-processed tasks. Therefore, the processing of multiple to-be-processed tasks in different modalities is completed, which not only ensures the accuracy of the task processing result but also reduces the difficulty in multi-modal multi-task processing, making the method for multi-modal multi-task processing applicable to various application scenarios and further improving the flexibility and reliability in use of the method.

Figure 3:
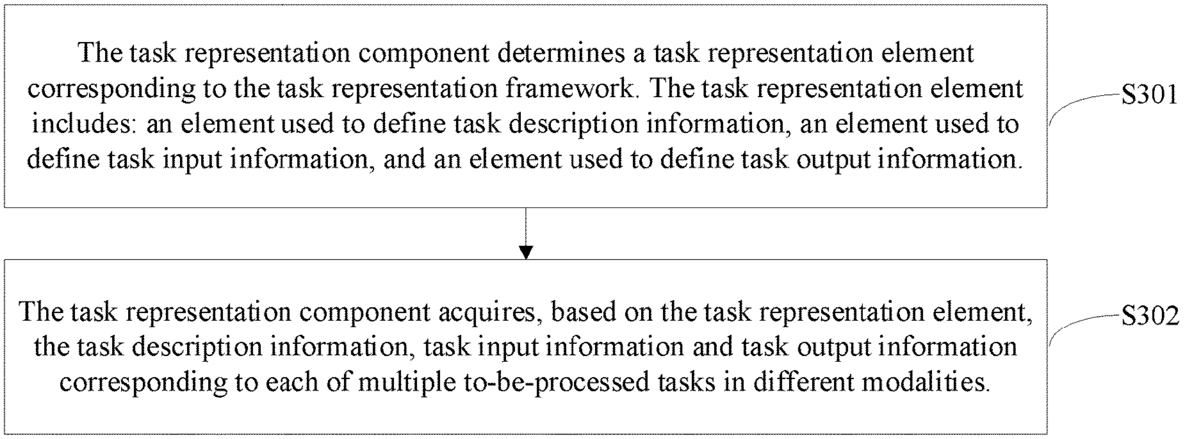
FIG. 3 is a schematic flow chart of acquiring multiple to-be-processed tasks in different modalities through a task representation framework, according to some embodiments of the present disclosure.

FIG. 3 is a schematic flow chart of acquiring multiple to-be-processed tasks in different modalities through a task representation framework, according to some embodiments of the present disclosure. Based on the above embodiments and with reference to FIG. 3, an implementation of acquiring multiple to-be-processed tasks in different modalities through a task representation framework is provided, where a task representation element corresponding to the task representation framework may be determined before the content of the to-be-processed tasks is acquired through the task representation frame. In some embodiments, that the task representation component acquires multiple to-be-processed tasks in different modalities through a task representation framework may include step S301 and S302.

At step S301, the task representation component determines a task representation element corresponding to the task representation framework. The task representation element includes: an element used to define task description information, an element used to define task input information, and an element used to define task output information.

Since the task representation framework is used to define a content format of to-be-processed tasks, in order to accurately acquire various task descriptions using a uniform content format, the task representation element corresponding to the task representation framework may be determined before the task representation component acquires the multiple to-be-processed tasks in different modalities. In some embodiments, the task representation element includes: an element used to define task description information, an element used to define task input information, and an element used to define task output information. The task description information refers to information describing a specific to-be-processed task, the task input information refers to specific information of task input, and the task output information only refers to specific information of task output. For example, when the to-be-processed task is an image recognition task, the task description information refers to objects such as items and people included in an image to be recognized; the task input information may refer to an address link of the image to be recognized, a name link of the image to be recognized, the image to be recognized, and the like; and the task output information may refer to the specific items, people, and the like included in the image to be recognized.

In some embodiments, the task identification element may include not only the above three elements, but also other custom elements, for example, an element used to define a duration of task processing, and an element used to define a precision of task processing, which can be configured according to the specific application scenario or application requirements by those skilled in the art, and will not be repeated here.

In some embodiments, the task representation element corresponding to the task representation framework may include only an element used to define the task description information and an element used to define the task input information. In some embodiments, the task representation element corresponding to the task representation frame may include only an element used to define the task description information.

At step S302, the task representation component acquires, based on the task representation element, the task description information, task input information and task output information corresponding to each of multiple to-be-processed tasks in different modalities.

After determining the task representation element corresponding to the task representation framework, the task representation component may acquire the task description information corresponding to each of the multiple to-be-processed tasks in different modalities based on the task representation element. Since the task representation element includes the element used to define the task description information, the element used to define the task input information, and the element used to define the task output information, the task description information, task input information, and task output information corresponding to each of the multiple to-be-processed tasks in different modalities are acquired based on the task representation element. The task input information may include: task input data and an input data type corresponding to the task input data. The task output information includes: task output data and an output data type corresponding to the task output data. In some embodiments, the input data type may include at least one of image, text, audio, graph, action, or the like, and the output data type may include at least one of image, text, audio, graph, action, or the like. The input data type and the output data types are not specifically limited and can be set by those skilled in the art according to the actual specific application requirements. It is to be noted that the number of task input information may be one or more, and the number of task output information may also be one or more.

In practical applications, there may be various types of tasks, any task can be described jointly by a triple form of task description information, task input information and task output information, without limiting the type of tasks. In some embodiments, the task description information, task input information and task output information corresponding to the various types of to-be-processed tasks can be acquired accurately and uniformly based on the task representation element. For example, if a to-be-processed task includes an image caption task, the task description information corresponding to the image caption task may be obtained based on the task representation element as: {input1} What does this image describe? {output1}; task input information: content=original image data, type=image; task output information: content=image caption text, type=text.

During the data processing using the processing apparatus, a new task may also be defined on demand. The defined new to-be-processed task may also acquire the corresponding task description information, task input information and task output information based on the task representation element. For example, when defining an image question-answer task for a local region, at this point, the task description information corresponding to the task can be obtained based on the task representation element as: what color is the object in the region {input2} of the image {input1}? {output1}; the task input information: first input content {input1}=original image data, type=image, second input content {input2}=detection box data, type=box; the task output information: content=question-answer description text, type=text. It can be seen from the above that the number of task input data may be one or more, and similarly the number of task output data may also be one or more.

For the processing apparatus, the task description information, task input information and task output information each have placeholder markers in order to help the processing apparatus to accurately acquire to-be-processed tasks in each modality. The above-mentioned placeholder markers are used for the user to fill in the real input data and output data into the corresponding placeholder positions.

In this example, in order to acquire multiple to-be-processed tasks in different modalities, a task representation element corresponding to the task representation framework is determined. The task representation element includes: an element used to define task description information, an element used to define task input information, and an element used to define task output information. Then, the task description information, task input information and task output information corresponding to each of the multiple to-be-processed tasks in different modalities are acquired based on the task representation element. That is, any task is described in text in a uniform format, so that the input data and output data in different modalities are effectively described with a limited number of input and output types, which is not only convenient for the user to apply the processing apparatus, but also convenient for the user to write the task and adjust operations of the processing apparatus according to needs, thereby effectively reducing the difficulty of developing the processing apparatus.

Figure 4:
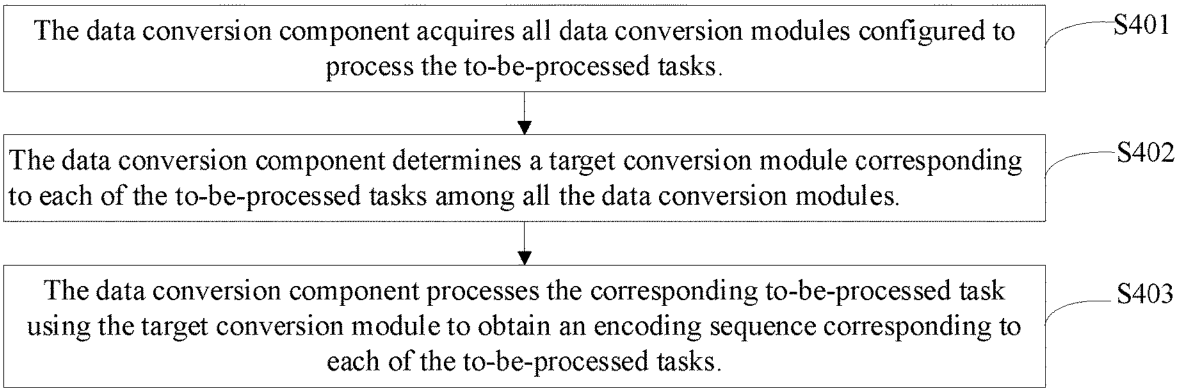
FIG. 4 is a schematic flow chart of determining an encoding sequence corresponding to each of multiple to-be-processed tasks, according to some embodiments of the present disclosure.

FIG. 4 is a schematic flow chart of determining an encoding sequence corresponding to each of multiple to-be-processed tasks, according to some embodiments of the present disclosure. Based on the above embodiment, and with reference to FIG. 4, an implementation of determining an encoding sequence corresponding to each of multiple to-be-processed tasks is provided. In some embodiments, that the data conversion component determines an encoding sequence corresponding to each of the multiple to-be-processed tasks may include step S401 to S403.

At step S401, the data conversion component acquires all data conversion modules configured to process the to-be-processed tasks.

At step S402, the data conversion component determines a target conversion module corresponding to each of the to-be-processed tasks among all the data conversion modules.

The apparatus for processing multi-modal multi-task processing is configured with data conversion modules for various modal types in advance. The configured data conversion modules for various modal types may support data conversion operations for data of various modal types. Currently, it may support data of image type, data of text type, data of audio type, data of detection frame type, and the like. If existing data conversion modules do not support processing of a modal type of data, the user may also configure the data conversion modules according to the actual application. Therefore, after multiple to-be-processed tasks in different modalities are acquired, in order to accurately analyze and process each of to-be-processed tasks, all the data conversion modules for processing the to-be-processed tasks may be acquired first.

Since in most cases, all the data conversion modules include a target conversion module for processing each of to-be-processed tasks, the target conversion module corresponding to each of the multiple to-be-processed tasks may be determined among all data conversion modules after all the data conversion modules are acquired. In some examples, the target conversion module corresponding to each of the to-be-processed tasks may be determined based on a pre-configured mapping relationship. In this case, among all the data conversion modules, determining the target conversion module corresponding to each of the to-be-processed tasks may include: determining a task identifier corresponding to each of the to-be-processed tasks, where the task identifier may be task name, task serial number, or task number; a mapping relationship between the task identifier and the data conversion module is pre-configured; and the target conversion module for processing each of to-be-processed tasks is determined based on the mapping relationship and the task identifier. In this case, different to-be-processed tasks may correspond to the same or different target conversion modules.

In some examples, in addition to determining the target conversion module based on the pre-configured mapping relationship, the target conversion module for processing each of to-be-processed tasks may also be determined based on a data modality or data type of each of to-be-processed tasks. In this case, among all the data conversion modules, determining a target conversion module corresponding to each of the to-be-processed tasks may include steps S4021 to S4023.

At step S4021, the data conversion component acquires a data modality corresponding to each of the to-be-processed tasks.

For each of to-be-processed tasks, the data modality corresponding to the each of to-be-processed tasks may be mainly determined based on the task input information in the each of to-be-processed tasks. In some embodiments, the data modality corresponding to each of the to-be-processed tasks can be determined based on the type of data in the task input information.

At step S4022, the data conversion component detects whether there is an adaptive conversion module that matches the data modality among all the data conversion modules.

Since to-be-processed tasks in different modalities may have different adaptive conversion modules, in order to be applicable to various application scenarios, the apparatus for multi-modal multi-task processing is pre-configured with adaptive conversion modules corresponding to the to-be-processed tasks in various modalities. For example, for a to-be-processed task where the data modality is plain text, a text adaptive conversion module is configured; for a to-be-processed task where the data modality is image, an image adaptive conversion module is configured; for a to-be-processed task where the data modality is action, an action adaptive conversion module is configured; and for a to-be-processed task where the data modality is audio, an audio adaptive conversion module is configured.

It can be seen from the above that in order to accurately process each of to-be-processed tasks, after the data modality corresponding to each of the to-be-processed tasks is acquired, it is possible to check whether there is an adaptive conversion module that matches the data module among all the data conversion modules. In some embodiments, searching and identification operations may be performed by means of the pre-configured mapping relationship between the data modality and the data conversion module.

At step S4023, if the adaptive conversion module that matches the data modality exists among all the data conversion modules, the data conversion component determines the adaptive conversion module as a target conversion module configured to process the to-be-processed task corresponding to the data modality.

If the adaptive conversion module that matches the data modality exists among all the data conversion modules, it means that the data modality corresponding to the to-be-processed task at this time is one of the data modalities that are preset to be able to support the processing operation. Therefore, the adaptive conversion module may be directly determined as a target conversion module for processing the to-be-processed task in order to obtain an encoding sequence by using the target conversion module to encode the corresponding to-be-processed task.

In practical applications, there may be a case where the user defines a new type or a new modality of to-be-processed task, that is, the data modality corresponding to the to-be-processed task is not pre-configured in the apparatus for multi-modal multi-task processing. In this case, in order to accurately process the above-mentioned to-be-processed task, the user may write and configure the adaptive conversion module based on the data modality. The process may include step S4024 and S4025.

At step S4024, if the adaptive conversion module that matches the data modality does not exist among all the data conversion modules, an adaptive conversion module matching the data modality is generated by the data conversion component.

At step S4025, the data conversion component determines the adaptive conversion module as a target conversion module configured to process the to-be-processed task corresponding to the data modality.

In the process of searching and identifying the data conversion module among all the data conversion modules, if an adaptive conversion module corresponding to the data modality of the to-be-processed task is not detected in all the data conversion modules, that is, none of the data conversion modules can accurately process the to-be-processed task, then the adaptive module corresponding to the data modality can be generated actively or passively. In some examples, the adaptive conversion module can be generated passively based on the configuration operation of the user. After a module configuration operation input by the user is acquired, based on the module configuration operation, the adaptive conversion module adapted to the data modality can be generated. Then the adaptive conversion module may be determined as a target conversion module configured to process the to-be-processed task corresponding to the data modality.

In some other examples, the processing apparatus may actively generate an adaptive conversion module adapted to the data modality based on the data modality corresponding to the to-be-processed task. In this case, among all the pre-configured standard data modalities, a target standard data modality that is most similar to the data modality of the to-be-processed task is determined, and a data conversion module corresponding to the target standard data modality is determined to be the adaptive conversion module adapted to the data modality. In some embodiments, a data conversion module corresponding to the target standard data modality is determined, and predetermined parameters in the data conversion module are adjusted based on a similarity between the target standard data modality and the data modality, so as to generate an adaptive conversion module adapted to the data modality.

In practical applications, in order to meet the different needs of different users, according to needs, all the data conversion modules of the processing apparatus can be added, deleted, modified, or the like. In some embodiments, after all the data conversion modules configured to process the to-be-processed tasks are acquired, the method for multi-modal multi-task processing may further include: acquiring a module configuration operation for adjusting all the data conversion modules, and performing operations such as adding, deleting, or modifying on all the data conversion modules based on the module configuration operation, to obtain the adjusted data conversion modules.

Therefore, various adjustment operations to the data conversion modules can be flexibly implemented based on the module configuration operation, making the adjusted data conversion modules better meet the actual application requirements, which can improve the efficiency of processing operations for the multiple to-be-processed tasks.

At step S403, the data conversion component processes the corresponding to-be-processed task using the target conversion module to obtain an encoding sequence corresponding to each of the to-be-processed tasks.

Since to-be-processed tasks in different modalities correspond to different target conversion modules, after the target conversion module corresponding to each of the to-be-processed tasks is determined, the target conversion module is used to process the corresponding to-be-processed task to obtain an encoding sequence corresponding to each of the to-be-processed tasks.

In some embodiments, before the target conversion module is used to process the corresponding to-be-processed task to obtain an encoding sequence corresponding to each of the to-be-processed tasks, a pre-processing operation may also be performed on the to-be-processed task corresponding to each data modality, to improve the quality and speed of processing the corresponding to-be-processed task based on the target conversion module.

In some embodiments, since the data modality corresponding to each of the to-be-processed tasks is different, then different pre-processing operations can be performed before the corresponding to-be-processed task is processed based on the target conversion module. For example, for a to-be-processed task where the data modality is plain text, before the corresponding task is processed using the target conversion module, the text content can be subjected to tokenization to obtain token information. For a to-be-processed task where the data modality is image, before the corresponding to-be-processed task is processed using the target conversion module, the input image can be divided to obtain patch information. For a to-be-processed task where the data modality is audio, before the corresponding to-be-processed task is processed using the target conversion module, a feature extraction process can be performed first to obtain an extracted feature. In some embodiments, a feature extraction operation may be performed by a convolutional neural network or other ways, as long as the accuracy of the extracted feature is guaranteed. For a to-be-processed task where the data modality is a bounding box, before the corresponding to-be-processed task is processed using the target conversion module, continuous normalized coordinates of the bounding box can be discretized to obtain the discretized coordinate information. For a to-be-processed task where the data modality is graph, table, and the like, before the corresponding to-be-processed task is processed using the target conversion module, the task can be converted into plain text first, and the text content can be tokenized to acquire token information, that is, after such data is converted to plain text, the subsequent processing operations can be referred to the processing of the to-be-processed task where the data modality is plain text, which will not be repeated here.

Figure 5:
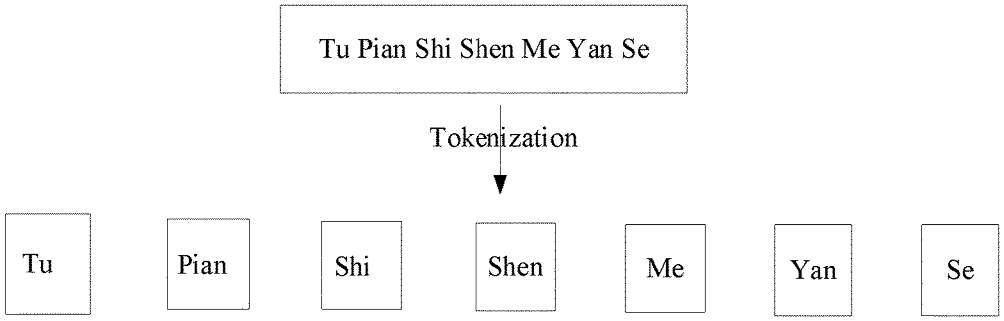
FIG. 5 is a schematic diagram of an example application scenario of a method of determining an encoding sequence corresponding to a to-be-processed task, according to some embodiments of the present disclosure.

In some embodiments, as shown in FIG. 5, after a data modality corresponding to each of the multiple to-be-processed tasks is determined, if the data modality corresponding to the to-be-processed task is plain text, a BPE (Byte Pair Encoding) tokenizer may be used to tokenize the text task to obtain a token sequence. For example, if the plain text content is “Tu Pian Shi Shen Me Yan Se”, the following token sequence can be obtained after tokenization: “Tu”, “Pian”, “Shi”, “Shen”, “Me”, “Yan”, “Se”. Then, the corresponding text target conversion module is used to process the token sequence to obtain the corresponding encoding sequence.

Figure 6:
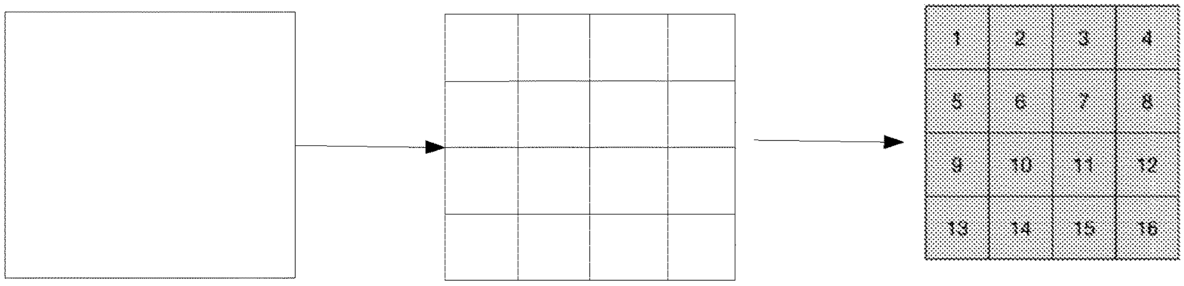
FIG. 6 is a schematic diagram of an example application scenario of a method of determining an encoding sequence corresponding to a to-be-processed task, according to some embodiments of the present disclosure.

For another example, when the data modality corresponding to the to-be-processed task is image, reference may be made to FIG. 6 for the processing operation process. First, the image corresponding to the image task is divided, so that a plurality of patches corresponding to the image can be obtained. Since the position of each patch has a great impact on the recognition and processing of the whole image, in order to accurately process the to-be-processed task, the position number of each patch may be determined and then the task processing operation is performed based on the patches and the position number.

It should be noted that for different image tasks, the corresponding image size may be different. In this case, the number of patches obtained is different when the image is divided. In order to uniformly mark the positions of the patches corresponding to all images, an implementation of determining the position number is used for the processing apparatus. In some embodiments, the processing apparatus may be configured to acquire an image with a maximum resolution, perform a dividing process on the image with the maximum resolution to obtain multiple standard patches, and perform position labeling on the multiple standard patches in a preset order (e.g., from left to right, and top to bottom) to obtain a standard position label corresponding to each of the multiple standard patches, so as to obtain a preset position matrix.

Generally, the image to be processed corresponding to most image processing tasks is at least a part of the image with the maximum resolution. The position number corresponding to the image can be determined based on the preset position matrix. For example, an interception operation may be performed on the preset position matrix, and the position number of individual patches in the image to be processed may be determined based on the standard position labels of the intercepted standard patches, thereby effectively ensuring the accuracy and reliability of determining the position number of each patch.

Assuming that the data modality corresponding to the to-be-processed task is action, the processing operation process may include: discretizing the acquired multi-frame action to obtain a discretized Token sequence, and processing the Token sequence by means of an action target conversion module to obtain the corresponding encoding sequence.

In this example, determining a target conversion module configured to process the to-be-processed tasks in different modalities based on different data modalities is effectively achieved, and the target conversion module is used to encode the to-be-processed tasks, so that the accuracy and reliability of determining the encoding sequence corresponding to each of the to-be-processed tasks is improved.

Moreover, the above operations may be performed simultaneously, thereby effectively improving the quality and efficiency of processing the multiple to-be-processed tasks in different modalities.

Figure 7:
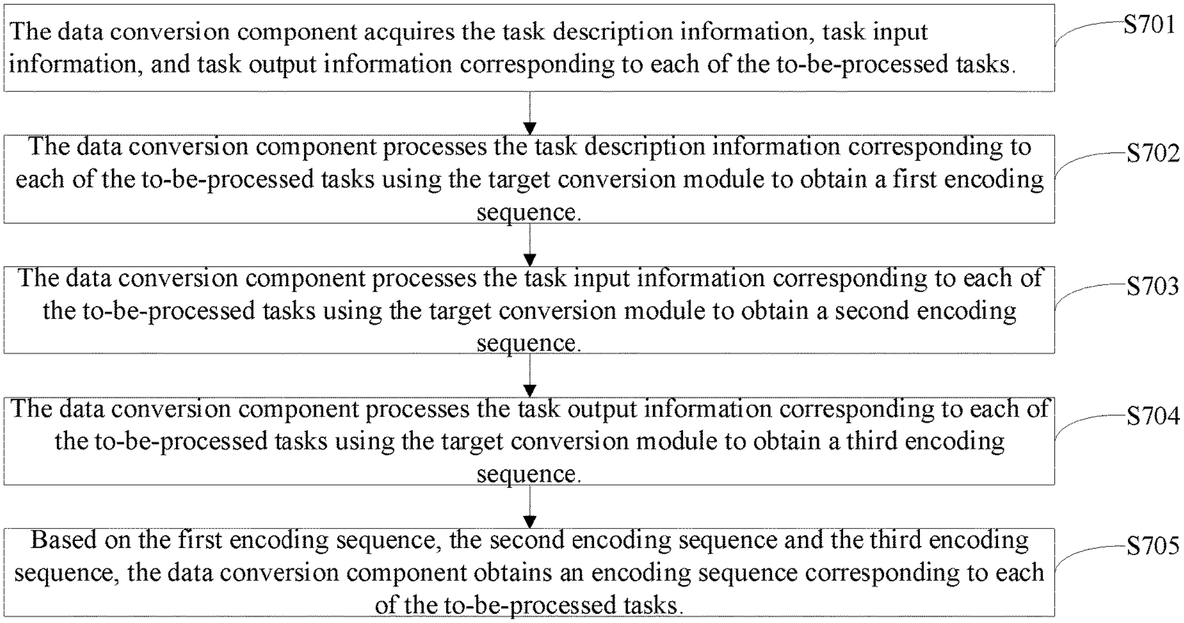
FIG. 7 is a schematic flow chart of obtaining an encoding sequence corresponding to each of the to-be-processed tasks, according to some embodiments of the present disclosure.

FIG. 7 is a schematic flow chart of obtaining an encoding sequence corresponding to each of the to-be-processed tasks, according to some embodiments of the present disclosure. Based on the above embodiments, and with reference to the FIG. 7, when a triple form task representation framework is used to obtain each of to-be-processed tasks, an implementation of obtaining an encoding sequence corresponding to each of the to-be-processed tasks by processing the corresponding to-be-processed task using a target conversion module is provided in this example. Specifically, that the data conversion component processes the corresponding to-be-processed task using the target conversion module to obtain an encoding sequence corresponding to each of the to-be-processed tasks includes step S701 to S705.

At step S701, the data conversion component acquires the task description information, task input information, and task output information corresponding to each of the to-be-processed tasks.

The task description information, task input information, and task output information corresponding to each of the to-be-processed tasks are acquired through the task representation framework. Since the task description information, task input information, and task output information are in the format of text description, and data modalities corresponding to each of the above-mentioned to-be-processed tasks are different, for the apparatus for multi-modal multi-task processing, the data content of the different modalities cannot be processed directly. In this case, the data content in different modalities can be converted into an encoding sequence that can be recognized by the processing apparatus. Thus, the task description information, task input information, and task output information corresponding to each of the multiple to-be-processed tasks can be acquired first, and then each of the information can be processed separately to obtain the corresponding encoding sequence. For a to-be-processed task, there may be cases where the task description information, task input information, and task output information are of different data modalities, then different target conversion modules can be used for conversion processing.

At step S702, the data conversion component processes the task description information corresponding to each of the to-be-processed tasks using the target conversion module to obtain a first encoding sequence.

After the task description information corresponding to each of the to-be-processed tasks is acquired, the task description information corresponding to each of the to-be-processed tasks is processed using the target conversion module to obtain the first encoding sequence. In some examples, the target transformation module corresponding to the to-be-processed task may be in different modalities. For example, if a to-be-processed task is a text processing task, the target conversion module for processing the text processing task can be identified as a byte-pair encoding adapter (i.e., BPE tokenizer), and the task description information in the text processing task can then be processed using the BPE tokenizer to obtain the first encoding sequence. When a to-be-processed task is an image processing task, it can be determined that the target conversion module for processing the image processing task may be an image discretization model VQGAN, and then the task description information in the image processing task can be processed using the image discretization model, for example, VQGAN (Vector Quantized Generative Adversarial Network), to obtain the first encoding sequence.

It should be noted that for to-be-processed tasks in different modalities, although generally the data modalities of the task description information of the to-be-processed tasks are plain text, the task description information can be identified by keyword recognition to determine the task content, so that a to-be-processed task in a modality corresponds to a unified target conversion module. A recognition function of text content can be integrated in the target conversion module, that is, each target conversion module can implement a simple text recognition operation.

At step S703, the data conversion component processes the task input information corresponding to each of the to-be-processed tasks using the target conversion module to obtain a second encoding sequence.

After the task input information corresponding to each of the to-be-processed tasks is acquired, the data modality corresponding to the task input information is determined. The corresponding target conversion module is determined based on the determined modality. The task input information corresponding to each of the to-be-processed tasks is processed based on the target conversion module to obtain the second encoding sequence.

In a conversion process of the task input information, the data modality corresponding to the task input information may be different, and the task input information in different modalities may correspond to different encoding processing methods. Accordingly, when converting the task input information, it is possible to determine whether the data information is continuous data and perform the corresponding conversion operation based on the determined data type. In some embodiments, processing the task input information corresponding to each of the to-be-processed tasks using the target conversion module to obtain a second encoding sequence may include step S7031 to S7033.

At step S7031, the data conversion component determines a data type of task input data in the task input information.

At step S7032, when the data type is discrete data, the data conversion component processes the task input information corresponding to each of the to-be-processed tasks using the target conversion module to obtain the second encoding sequence.

At step S7033, when the data type is continuous data, the data conversion component acquires a glossary used to process the task input data, and processes the task input information corresponding to each of the to-be-processed tasks using the glossary and the target conversion module to obtain the second encoding sequence.

The glossary is used for a data encoding operation. Task input data in different modalities often correspond to different glossaries. In order to implement the encoding of data of various modalities, various glossaries are pre-configured. For example, if the data modality is plain text, there is a text glossary; if the data modality is image, there is an image glossary; if the data modality is speech, there is a speech glossary, and the like. After the above-mentioned glossaries are acquired, in order to facilitate a calling operation of each glossary, the above-mentioned glossaries of different data modalities can be collected into a unified discrete glossary, which is stored in a pre-defined storage area of the apparatus for multi-modal multi-task processing. When a glossary is needed, the unified discrete glossary may be read directly, and the discrete glossary contains the glossaries for processing the data of each modality.

After the task input information is acquired, in order to achieve a better conversion effect, the data type of the task input data may be determined, and then the task input data may be encoded in different ways based on different data types. For example, when the data type is discrete data, the task input information corresponding to each of the to-be-processed tasks may be processed directly using the target conversion module to obtain the second encoding sequence. When the data type is continuous data, a glossary for processing the task input data is acquired, and the task input information corresponding to each of the to-be-processed tasks is processed using the glossary and the target conversion module to obtain the second encoding sequence.

In some embodiments, when the task input data in the task input information is an image, the image will be divided to obtain a plurality of patches corresponding to the image, and positions of the patches corresponding to the plurality of patches can directly affect an image encoding result. Therefore, when the data input data in the task input information is an image, the task input information corresponding to each of the to-be-processed tasks is processed using the glossary and the target conversion module to obtain a second encoding sequence may include: dividing the image to obtain a plurality of patches corresponding to the image. Then, the corresponding position numbers of the plurality of patches are determined. Finally, the image corresponding to each of the to-be-processed tasks is processed by the target conversion module to obtain the second encoding sequence based on the glossary and position number.

The position number of a patch is used to identify the position and number information of the patch in relation to the image position, which may be acquired based on a predefined rule. In order to determine the position numbers of the patches of different sizes using a uniform rule, the above-mentioned preset rule may be based on the rule obtained after dividing an image with a largest precision/size. For example, a plurality of patches corresponding to the image with the largest size or the largest precision that can be supported are first acquired, and then a sequential encoding operation is performed on the plurality of patches, so as to obtain an original patch number. The size or precision of the image in a subsequent image processing task is often smaller than the size or precision of the image with the maximum size or precision, thus the patch number corresponding to the image in the subsequent image processing task is often a part of the original patch number. For example, the position number may be obtained by intercepting the original patch number, so that the position number of each patch corresponding to different images may be effectively determined by a uniform rule, which is conducive to faster convergence and faster processing.

Figure 8:
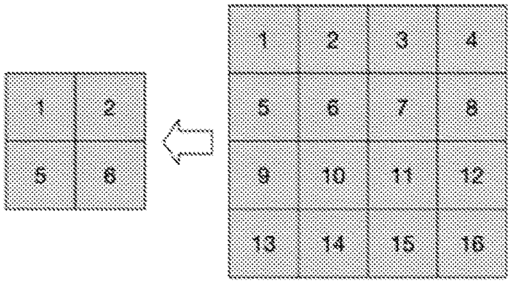
FIG. 8 is a schematic diagram of an example application scenario of determining a position number of each of patches corresponding to different images, according to some embodiments of the present disclosure.

In some embodiments, the implementation of determining the position number of each patch corresponding to different images may refer to FIG. 8. First, the image is divided to obtain a plurality of patches corresponding to the image. An original image is acquired with a maximum precision/size. Then, the original image with the maximum precision/size is divided to obtain each patch corresponding to the original image. The position corresponding to each patch corresponding to the original image is encoded sequentially to obtain the original patch number. Finally, the original image is intercepted to obtain a plurality of patches corresponding to the image, and the number of the intercepted patch is determined as the corresponding position number of each of the plurality of patches.

After the position number of each patch is acquired, the image corresponding to each of the to-be-processed tasks may be processed using the target conversion module, the glossary and the position number, to obtain the second encoding sequence, thereby effectively ensuring the accuracy and reliability of acquiring the second encoding sequence and making the obtained encoding sequence more effective.

At step S704, the data conversion component processes the task output information corresponding to each of the to-be-processed tasks using the target conversion module to obtain a third encoding sequence.

Similarly, after the task output information corresponding to each of the to-be-processed tasks is acquired, the target conversion module may be used to process the task input information corresponding to each of the to-be-processed tasks to obtain the third encoding sequence. For example, that the data conversion component processes the task output information corresponding to each of the to-be-processed tasks using the target conversion module to obtain a third encoding sequence may include step S7041 to S7043.

At step S7041, the data conversion component acquires a glossary used for processing of the task output information.

At step S7042, the data conversion component processes the task input information corresponding to each of the to-be-processed tasks using the glossary and the target conversion module to obtain the third encoding sequence.

When processing the task output information, the glossary for processing of the task output information may be acquired first. A data modality corresponding to the task output data is found in the acquired glossary, and based on the data modality corresponding to the task output data, the task output information corresponding to each of the to-be-processed tasks is processed using the target conversion module to obtain the third encoding sequence.

At step S705, based on the first encoding sequence, the second encoding sequence and the third encoding sequence, the data conversion component obtains an encoding sequence corresponding to each of the to-be-processed tasks.

Since each of the obtained to-be-processed tasks includes the corresponding task description information, task input information, and task output information, when performing encoding conversion on each of the obtained to-be-processed tasks, the task description information, task input information, and task output information can be encoded separately to obtain the first encoding sequence, the second encoding sequence, and the third encoding sequence. Based on the first encoding sequence, the second encoding sequence and the third encoding sequence, an encoding sequence corresponding to each of the multiple to-be-processed tasks is obtained. In some examples, the first encoding sequence, the second encoding sequence and the third encoding sequence can be directly spliced together to obtain the encoding sequence corresponding to each of the to-be-processed tasks. In some other examples, the first encoding sequence, the second encoding sequence and the third encoding sequence may be subjected to a fusion processing in a predetermined manner to obtain the encoding sequence corresponding to each of the to-be-processed tasks.

In such embodiments, the task description information, task input information and task output information corresponding to each of the to-be-processed tasks are acquired, and are processed respectively using the target conversion module to respectively obtain the first encoding sequence, the second encoding sequence and the third encoding sequence. Then, the encoding sequence corresponding to each of the to-be-processed tasks is obtained based on the first encoding sequence, the second encoding sequence and the third encoding sequence, thus effectively ensuring acquisition of the encoding sequence corresponding to each of the to-be-processed tasks, which is conducive to improving the quality and efficiency of the analysis processing for each of to-be-processed tasks.

Figure 9:
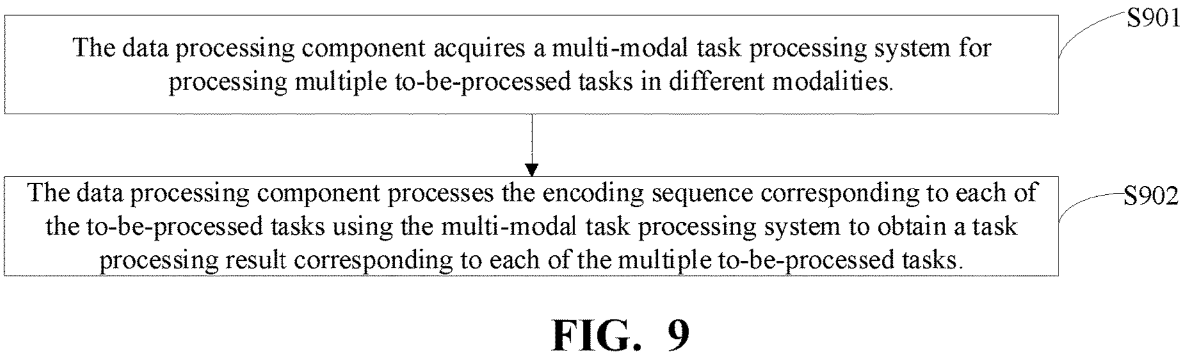
FIG. 9 is a schematic flow chart of obtaining a task processing result corresponding to each of multi-modal tasks, according to some embodiments of the present disclosure.

FIG. 9 is a schematic flow chart of obtaining a task processing result corresponding to each of multi-modal tasks according to some embodiments of the present disclosure. Based on the above embodiments and with reference to FIG. 9, an implementation of processing multi-modal tasks based on an encoding sequence to obtain a task processing result corresponding to each of the multi-modal tasks is provided in some embodiments. For example, that the data processing component processes to-be-processed tasks based on the encoding sequence corresponding to each of the to-be-processed tasks to obtain a task processing result corresponding to each of the multiple to-be-processed tasks may include step S901 and S902.

At step S901, the data processing component acquires a multi-modal task processing system for processing multiple to-be-processed tasks in different modalities.

In order to improve the quality and efficiency of processing the multiple to-be-processed tasks in different modalities, the multi-modal task processing system for processing multiple to-be-processed tasks in different modalities is pre-trained, which may be an AI (Artificial Intelligence) system.

At step S902, the data processing component processes the encoding sequence corresponding to each of the to-be-processed tasks using the multi-modal task processing system to obtain a task processing result corresponding to each of the multiple to-be-processed tasks.

In some embodiments of the present disclosure, the multiple to-be-processed tasks in multiple modalities may be processed by means of the pre-trained multi-modal task processing system. The multi-modal task processing system may directly process the encoding sequence to obtain the task processing result corresponding to each of the multiple to-be-processed tasks.

When processing each of to-be-processed tasks using the multi-modal task processing system, in order to improve the quality and effect of processing each of to-be-processed tasks, a trie for processing each of to-be-processed tasks may be configured in the multi-modal task processing system, which not only can ensure the accuracy of task processing, but also can improve the efficiency of task processing.

Figure 10:
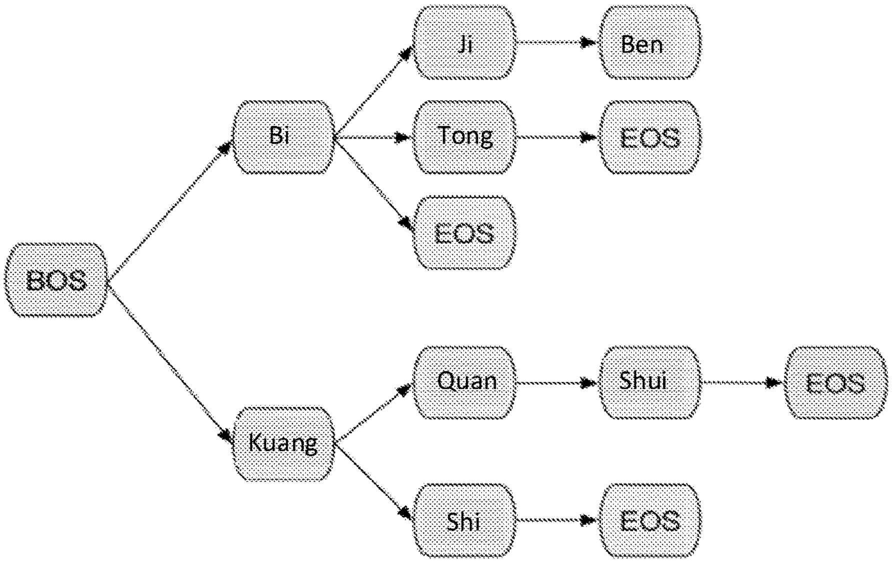
FIG. 10 is a schematic diagram of an example application scenario of processing each of to-be-processed tasks based on a trie, according to some embodiments of the present disclosure.

In some embodiments, with reference to FIG. 10, for example, in the analysis of "bi ji ben", the beginning character BOS may be obtained as "bi" through tokenization. A trie shows that for the beginning character "bi", there are three branches in the trie, where branch 1 refers to character "ji" after character "bi" and character "ben" after the character "ji". A word corresponding to this branch 1 is "bi ji ben". Similarly, branch 2 refers to character "tong" after character "bi" and character "EOS" after character "tong". A word corresponding to this branch 2 is "bi tong". Similarly, branch 3 refers to character "EOS" after character "bi". A word corresponding to branch 3 is "bi" alone. During the analysis, only the child nodes of the node where the generated word is currently included are considered, and branch 1 is finally obtained. The BOS is used to identify the beginning character and the EOS is used to identify the ending character. Similarly, in the analysis of "Kuang Quan Shui", the beginning character BOS can be obtained as "Kuang" through tokenization. A trie shows that for the beginning character "Kuang", there are two branches in the trie, where branch 1 refers to character "Quan" after character "Kuang" and character "Shui" after the character "Quan". A word corresponding to branch 1 is "Kuang Quan Shui". Similarly, branch 2 refers to character "Shi" after character "Kuang" and character "EOS" after the character "Shi", A word corresponding to branch 2 is "Kuang Shi". During the analysis, only the child nodes of the node where the generated word is currently included are considered, and branch 1 is finally obtained.

In the embodiments of the present disclosure, the encoding sequence corresponding to each of the to-be-processed tasks is processed directly based on the acquired multi-modal task processing system, which can improve the quality and efficiency of processing the each of to-be-processed tasks. Moreover, the same multi-modal task processing system can process multiple to-be-processed tasks in various modalities in various application scenarios, thereby further improving the range of application and convenience of this method.

It should be noted that in order to enable the processing of multiple to-be-processed tasks in different modalities using the multi-modal task system, before acquiring the multi-modal task processing system for processing the multiple tasks in different modalities, the method may also include a process of training the multi-modal task system. For example, with reference to FIG. 11, an implementation of performing learning training on a plurality of samples in different modalities to obtain a multi-modal task system is provided, which may include step S1101 to S1103.

At step S1101, a learning training component acquires training samples through the task representation framework. The training samples correspond to multiple data modalities, and each training sample corresponds to a standard processing result.

In order to enable the multi-modal task system to accurately process multiple to-be-processed tasks in different modalities, the multi-modal task system may acquire training samples through the task representation framework. For example, the acquisition of training samples is similar to the acquisition of the multiple to-be-processed tasks in different modalities in the above embodiments, which can be referred to the above description and will not be repeated here.

Since the training samples are used to implement learning training operations for multi-modal tasks, the training samples correspond to multiple data modalities. The multiple data modalities may include: a text data modality, an image data modality, an audio data modality, a graph data modality, a video data modality, a table data modality, and all other data modalities that are predictable. Each training sample mentioned above may have a standard processing result correspondingly, which can make the learning training result more accurate. Moreover, when performing learning training on the multi-modal task system, a tutorial loss function that encourages simple sample learning may be used as an objective function for pre-training and fine-tuning operations on the trained multi-modal task.

At step S1102, the learning training component determines a plurality of target samples in different modalities among the training samples.

When performing learning training on the multi-modal task system, there are many training samples obtained. In order to efficiently perform learning training on the multi-modal task system, after the training samples are acquired, a plurality of target samples in different modalities are determined among the training samples. In some examples, an implementation of determining a plurality of target samples in different modalities may include: randomly determining a plurality of target samples in different modalities among the plurality of training samples; alternatively, acquiring sample scale parameters for determining a plurality of target samples in different modalities, and determining the plurality of target samples in different modalities among the plurality of training samples based on the sample scale parameters.

When training the multi-modal task system, a multi-task scheduler is configured, and the multi-task scheduler is used to control to use different sample mixing strategies in training samples to determine target samples in different modalities. In some embodiments, the multi-task scheduler may be configured with a random mixing strategy, that is, randomly determining a plurality of target samples in different modalities among the plurality of training samples, as long as the target samples can be guaranteed to be of multiple different modalities. In some embodiments, the multi-task scheduler may be configured with a sample scale parameter. The value of the sample scale parameter may be configured or adjusted by the user according to requirements or application scenarios; and then a plurality of target samples in different modalities are determined based on the configured sample scale parameter, thus effectively ensuring the accuracy and reliability of determining the plurality of target samples in different modalities.

In some embodiments, after the plurality of target samples in different modalities are determined, there may be new training samples, and the method may also include: acquiring additional samples through the task representation framework and adding the additional samples to the target samples to obtain adjusted samples used for training of the multi-modal task processing system.

In some embodiments, during the training of the multi-modal task system, the user can add samples at any time according to the actual application requirements, i.e., adjust the training samples. In order to avoid reducing the learning training efficiency of the multi-modal task system, a current training version of the multi-modal task system may be determined when the additional samples are obtained, and the current training version of the multi-modal task system is output, so that the user may perform application operations based on the multi-modal tasks of the current training samples.

After the additional samples are acquired, in order to improve the training quality and effect of the multi-modal task system and the accuracy of task processing of the multi-modal task system, the additional samples can be added to the target samples to obtain the adjusted samples. In the above implementation, a task crowdsourcing model is used to acquire samples used for training of the multi-modal task system. After the user-oriented task description is programmed, the task scheduler may not only continuously incorporate the additional tasks into the multi-modal task system to improve the quality and efficiency of learning training of multi-modal tasks, but also enable the trained multi-task processing system to process tasks of various modal types, thus improving applicability of the method and making the method applicable to more scenarios.

At step S1103, the learning training component performs learning training on the plurality of target samples in different modalities to obtain the multi-modal task processing system or the data processing component.

After the plurality of target samples in different modalities are determined, the plurality of target samples in different modalities and the standard processing results corresponding to the target samples may be subjected to learning training, to obtain the multi-modal task processing system or the data processing component. The obtained multi-modal task processing system or data processing component can process based on the encoding sequence corresponding to each of the to-be-processed tasks, thus effectively ensuring the effect of processing the to-be-processed tasks.

Figure 12:
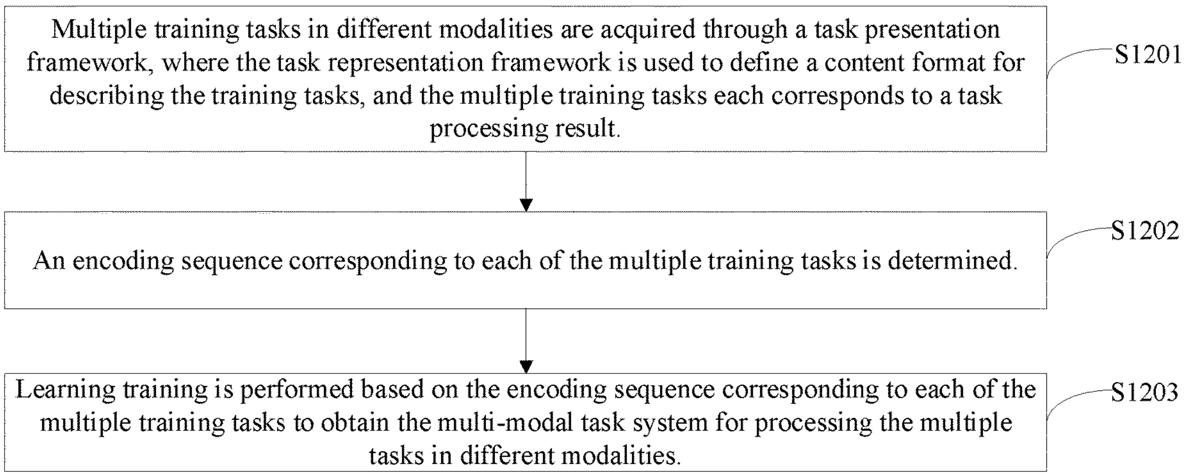
FIG. 12 is a schematic flow chart of an example training method of a system for multi-modal multi-task processing, according to some embodiments of the present disclosure.

FIG. 12 is a schematic flow chart of a training method for a multi-modal task system according to some embodiments of the present disclosure. Referring to FIG. 12, a training method for a multi-modal task system is provided. An execution subject of the method may be a training apparatus for the multi-modal task system. It is to be understood that the processing apparatus may be implemented as software, or a combination of software and hardware. The method for multi-modal multi-task processing may include step S1201 to S1203.

At step S1201, multiple training tasks in different modalities are acquired through a task representation framework, where the task representation framework is used to define a content format for describing the training tasks, and the multiple training tasks each corresponds to a task processing result.

At step S1202, an encoding sequence corresponding to each of the multiple training tasks is determined.

At step S1203, learning training is performed based on the encoding sequence corresponding to each of the multiple training tasks to obtain the multi-modal task system for processing the multiple tasks in different modalities.

The multiple training tasks in different modalities are obtained through the task representation framework. The encoding sequence corresponding to each of the multiple training tasks is determined. Then, learning training is performed based on the encoding sequence corresponding to each of the multiple training tasks, and the multi-modal task system for processing the multiple tasks in different modalities is obtained. The specific implementation is similar to the implementation of the steps in the embodiments described above, which can be referred to the above description and will not be repeated here.

Figure 13:
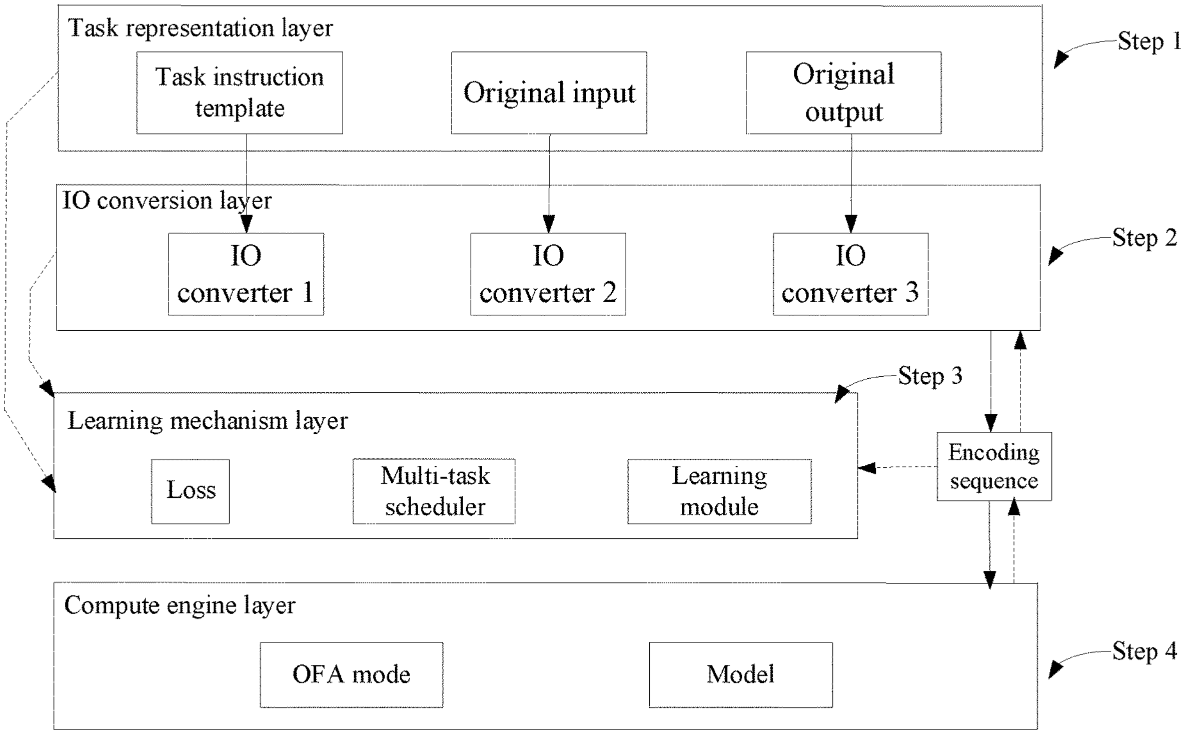
FIG. 13 is a schematic diagram of an example application of a training method of a system for multi-modal multi-task processing, according to some embodiments of the present disclosure.

In some embodiments, with reference to the task representation framework with a seq2seq structure as an example, as shown in FIG. 13, a training process of the multi-modal task system may include step 1 to step 4.

At step 1, a uniform task representation framework with a seq2seq structure is used to obtain various types of training tasks containing inputs and outputs in different modalities in a generative manner.

For example, based on a language description instruction, any modal training task can be described jointly by the task representation framework of a triple from of <task text description, *input, *output>. The input and output may be represented by <content, type>, and the type may include image, text, audio, graph, table, and the like. The task text description has placeholder markers of the input and output, and the real input and output data may be filled into the corresponding placeholder positions when data processing is performed.

For example, an "Image Caption" task may be represented in the task representation framework as <"{input1} What does this image describe? {output1}", *Input, *Output>, "*Input" may be <content=$original image data, type=image>, "*Output" may be <content=$image caption text, type=text>.

By the above approach, it is effectively achieved to describe most training tasks according to a unified representation framework, that is, describing tasks in text, thus enabling the use of a limited number of input and output types to describe the input and output data in different modalities, which makes it easy for a user without much AI foundation to write for AI models for any multi-modal tasks through a task description interface.

At step 2, the obtained various types of training tasks are converted by an IO conversion layer to obtain encoding sequences corresponding to the various types of training tasks.

Different IO converters may be used for different modal types of training data to convert the input and output data in original-modal training tasks into intermediate results (coding sequences) that a compute engine can accept and complete the computation. The system already supports different types/modalities of data such as text, image, audio, bounding box, graph, table, and the like. Moreover, new types may also be dynamically supported. IO modal types supported by the system and corresponding IO converters are as follows:

a. For a training task of plain text, a byte pair encoder (BPE tokenizer) may be used to segment a text input into Token sequences, and then map the Token sequences into encoding sequences. When processing output data, a unified glossary is needed.
b. For a training task of image data, an input image may be first divided into patches (16×16). Image encoding features may be extracted by CV Backbone such as the residual network Resnet. The encoding sequence corresponding to the image is formed according to position number generated by the scalable image position encoding. Then the encoding sequence may be input to the compute engine.
c. For a training task of customized-modal data, for example, if the customized-modal data in a training task is data of Bounding Box type in the target detection, the continuous normalized coordinates of the bounding box may be discretized in binning and mapped to the corresponding encoding sequence.
d. For a training task of audio data, for an input audio, feature information (FBank features) of the audio data may be acquired first, and then feature extraction is performed by a convolutional neural network CNN to form an encoding sequence; for an output audio, a prediction word list of vector quantization Vq-Vae may be used for encoding of the output data.
e. For a training task of data such as graph, table (Key-Value pair), such data structures may be converted into plain text data and then converted using a Text IO Adaptor, so as to form the corresponding encoding sequence.

It should be noted that in order to facilitate conversion of each type of training task, glossaries corresponding to the output data of the above different modalities may be brought together to form a unified set of discrete vector spaces, and this set of vector spaces is shared among all the tasks.

In general, for the input data of various training tasks, the corresponding IO Adaptor may be called to perform a conversion operation according to type information of the input data so as to convert the corresponding data into the encoding sequence. For the output data of various training tasks, output may be based on prediction of the compute engine. The data type corresponding to the output data may be searched in the set of vector spaces. The glossary for encoding of the output data is determined based on the data type. The output data is converted based on the glossary to obtain the encoding sequence.

It should be noted that the multi-modal task system trained in this example may achieve dynamic output when processing a task. For example, when user A has a processing task of "generate a promotional article" at time t1, promotional article 1 may be generated when the above processing task is processed using the multi-modal task system, which may include text content, pictures, graphs, and the like. When user A also has a processing task of "generate a promotional article" at time t2, promotional article 2 may be generated when the above processing task is processed by the multi-modal task system, which may include text content, pictures, graphs and the like. However, promotional article 1 is different from promotional article 2 in that: the text content is different, the pictures are set in different positions, positions of the graphs are different, and the like, thus effectively realizing a dynamic output operation of the task processing result.

At step 3, learning training is performed based on the encoding sequence corresponding to each of the multiple training tasks to obtain the multi-modal task system for processing process the multiple tasks in different modalities.

At step 4, a generic compute engine implements the training and fine-tuning to obtain the final multi-modal task system.

A Transformer Encoder-Decoder structure of a graph neural network of the same depth (number of layers) may be used as a basic structure of the compute engine. In order to improve the stability of model training and accelerate a convergence speed, a network basic unit in each graph neural network in the transformer encoder-decoder may be transformed into a Normformer Block, which may be adjusted by adjusting a preset parameter of a network layer.

For an encoder in the graph neural network, the encoder can receive encoding sequence data corresponding to each training task from the input. While for a generative plug-in in the decoder, the output logic of a generative model has more conditional restrictions than the input encoding, including a prior restriction and a restriction on the finite candidate set related to the tasks. Therefore, in order to solve the above technical problems, a data processing operation may be carried out with a trie, which may improve the quality and efficiency of data processing.

After the initial acquisition of the multi-modal task system, a fine-tuning operation may be performed on the multi-modal task system. For example, in a Finetune phase, there is no need to introduce additional Head, Prompt, and other similar task-related parameters, but the same task representation and training method as in a pre-training phase is adopted, that is, the fine-tuning operation is performed on the multi-modal task system in exactly the same way as the training method.

According to the technical solutions provided in this example, the construction of a multi-modal multi-task scalable open AI learning system by means of a unified multi-modal multi-task representation method and a unified training framework is effectively achieved. For example, the unified task representation framework is used to represent multi-modal and multi-task learning, so that the user moves from model structure-oriented programming to task description-oriented programming, lowering the development barrier. In addition, since a different-modal IO conversion mechanism is shared between different tasks, it is applicable to more multi-modal tasks. For example, through a system abstraction operation, a (new) multi-modal task may be described in natural language, the training and inference of different tasks share the same compute engine and the same set of different-modal IO conversion mechanism, and the system output may also select different IO converters for different-modal outputs based on task description. Thus, a modal and task scalable open AI learning system is obtained. The obtained multi-modal task system may achieve the processing of multi-modal tasks while ensuring the accuracy of the task processing result, thereby further improving practicality of the method.

Some embodiments of the present disclosure provide a method for multi-modal multi-task processing of a multi-modal task open learning system based on a unified representation. The method for multi-modal multi-task processing can process tasks of various modalities. The method for multi-modal multi-task processing includes the following steps 11 to 26.

At step 11, a task representation element corresponding to a task representation framework is determined, where the task representation element includes: an element used to define task description information, an element used to define task input information, and an element used to define task output information.

At step 12, based on the task representation element, the task description information, task input information and task output information corresponding to each of the multiple to-be-processed tasks in different modalities are acquired.

At step 13, all data conversion modules configured to process the to-be-processed tasks are acquired.

At step 14, a data modality corresponding to each of the multiple to-be-processed tasks is acquired.

At step 15, whether there is an adaptive conversion module that matches the data modality is detected among all the data conversion modules.

At step 16, if the adaptive conversion module that matches the data modality exists, then the adaptive conversion module is determined as a target conversion module configured to process the to-be-processed task corresponding to the data modality.

At step 17, if there is no adaptive conversion module that matches the data modality among all the data conversion modules, a module configuration operation input by the user is acquired. An adaptive conversion module that matches the data modality is generated based on the module configuration operation. Then, the adaptive conversion module is determined as a target conversion module configured to process the to-be-processed task corresponding to the data modality.

At step 18, the task description information, task input information, and task output information corresponding to each of the multiple to-be-processed tasks are acquired.

At step 19, the task description information corresponding to each of the to-be-processed tasks is processed using the target conversion module to obtain a first encoding sequence.

At step 20, whether the task input data included in the task input information being continuous data is identified.

At step 21, when the task input data is discrete data, the task input information corresponding to each of the to-be-processed tasks is processed using the target conversion module to obtain a second encoding sequence. When the task input data is continuous data, a glossary used for processing of the task input data is acquired, and the task input information corresponding to each of the to-be-processed tasks is processed using the glossary and the target conversion module to obtain a second encoding sequence.

At step 22, a glossary used for processing of the task output information is acquired.

At step 23, the task input information corresponding to each of the to-be-processed tasks is processed using the glossary and the target conversion module to obtain a third encoding sequence.

At step 24, based on the first encoding sequence, the second encoding sequence and the third encoding sequence, an encoding sequence corresponding to each of the multiple to-be-processed tasks is obtained.

At step 25, a multi-modal task processing system for processing the multiple tasks in different modalities is obtained.

At step 26, the encoding sequence is processed using the multi-modal task processing system to obtain a task processing result corresponding to each of the multiple to-be-processed tasks.

In the technical solution provided in the example, multiple to-be-processed tasks in different modalities are obtained through the task representation frame, that is, the multiple to-be-processed tasks in different modalities may be described by the unified task representation frame. The encoding sequence corresponding to each of the multiple to-be-processed tasks is then determined, and the each of to-be-processed tasks is processed based on the encoding sequence, to obtain the task processing result corresponding to each of the multiple to-be-processed tasks, so that the processing of the multiple to-be-processed tasks in different modalities is completed, which not only ensures the accuracy of the task processing result but also reduces the difficulty in multi-modal multi-task processing, making the method for multi-modal multi-task processing applicable to various application scenarios.

Figure 14:
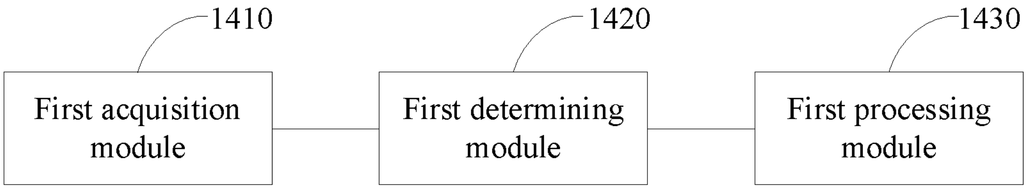
FIG. 14 is a schematic structural diagram of an example apparatus for multi-modal multi-task processing, according to some embodiments of the present disclosure.

FIG. 14 is a schematic flow chart of an apparatus for multi-modal multi-task processing according to some embodiments of the present disclosure. With reference to FIG. 14, an apparatus for multi-modal multi-task processing is provided. The apparatus for multi-modal multi-task processing is used to execute the method for multi-modal multi-task processing shown in FIG. 2. The apparatus for multi-modal multi-task processing may include a first acquisition module 1410, a first determining module 1420, and a first processing module 1430.

First acquisition module 1410 is configured to acquire multiple to-be-processed tasks in different modalities through a task representation framework, where the task representation framework is used to define a content format for describing the to-be-processed tasks.

First determining module 1420 is configured to determine an encoding sequence corresponding to each of the to-be-processed tasks.

First processing module 1430 is configured to process the to-be-processed tasks based on the encoding sequence corresponding to each of the to-be-processed tasks, to obtain a task processing result corresponding to each of the multiple to-be-processed tasks.

In some embodiments, first acquisition module 1410 is configured to determine a task representation element corresponding to the task representation framework, where the task representation element includes: an element used to define task description information, an element used to define task input information, and an element used to define task output information; and based on the task representation element, to acquire the task description information, task input information, and task output information corresponding to each of the multiple to-be-processed tasks in different modalities.

In some embodiments, the task input information includes: task input data and an input data type corresponding to the task input data. The task output information includes: task output data and an output data type corresponding to the task output data.

In some embodiments, first determining module 1420 is configured to: acquire all data conversion modules configured to process the to-be-processed tasks; determine, among all the data conversion modules, a target conversion module corresponding to each of the to-be-processed tasks; and process the corresponding to-be-processed task using the target conversion module, to obtain an encoding sequence corresponding to each of the to-be-processed tasks.

In some embodiments, when determining a target conversion module corresponding to each of the multiple to-be-processed tasks among all the data conversion modules, first determining module 1420 is configured to: acquire a data modality corresponding to each of the to-be-processed tasks; detect, among all the data conversion modules, whether there is an adaptive conversion module that matches the data modality; and if the adaptive conversion module that matches the data modality exists, determine the adaptive conversion module as a target conversion module for processing the to-be-processed task corresponding to the data modality.

In some embodiments, when determining a target conversion module corresponding to each of multiple to-be-processed tasks among all the data conversion modules, first determining module 1420 is configured to: generate an adaptive conversion module that is adapted to the data modality if there is no adaptive conversion module that matches the data modality among all the data conversion modules; and determine the adaptive conversion module as a target conversion module for processing the to-be-processed task corresponding to the data modality.

In some embodiments, after acquiring all the data conversion modules for processing the to-be-processed tasks, the processing apparatus may further include a configuration module. The configuration module is configured to: acquire a module configuration operation for adjusting all the data conversion modules; and perform an operation such as adding, deleting, or modifying on all the data conversion modules based on the module configuration operation to obtain the adjusted data conversion modules.

In some embodiments, first determining module 1420 is configured to: acquire the task description information, task input information and task output information corresponding to each of the to-be-processed tasks; process the task description information corresponding to each of the to-be-processed tasks using the target conversion module to obtain a first encoding sequence; process the task input information corresponding to each of the to-be-processed tasks using the target conversion module to obtain a second encoding sequence; process the task output information corresponding to each of the to-be-processed tasks using the target conversion module to obtain a third encoding sequence; and based on the first encoding sequence, the second encoding sequence and the third encoding sequence, obtain an encoding sequence corresponding to each of the to-be-processed tasks.

In some embodiments, first determining module 1420 is configured to: determine a data type of the task input data in the task input information; and when the data type is discrete data, process the task input information corresponding to each of the to-be-processed tasks using the target conversion module to obtain a second encoding sequence; when the data type is continuous data, acquire a glossary used for processing of the task input data, and process the task input information corresponding to each of the to-be-processed tasks using the glossary and the target conversion module to obtain a second encoding sequence.

In some embodiments, first determining module 1420 is configured to: when the task input data in the task input information is an image, divide an image to obtain a plurality of patches corresponding to the image; determine the position number corresponding to each of the plurality of patches; and based on the glossary and the position number, process the image using the target conversion module to obtain a second encoding sequence.

In some embodiments, first determining module 1420 is configured to: acquire a glossary used for processing of the task output data, and process the task output information corresponding to each of the to-be-processed tasks using the glossary and the target conversion module to obtain a third encoding sequence.

In some embodiments, first processing module 1430 is configured to: acquire a multi-modal task processing system for processing the multiple to-be-processed tasks in different modalities; and process the encoding sequence corresponding to each of the to-be-processed tasks using the multi-modal task processing system to obtain a task processing result corresponding to each of the multiple to-be-processed tasks.

In some embodiments, before acquiring the multi-modal task processing system for processing the multiple tasks in different modalities, the processing apparatus may further include a first training module. The first training module is configured to: acquire training samples through the task representation framework, the training samples corresponding to a plurality of data modalities, and each training sample corresponding to a standard processing result; determine, among the training samples, a plurality of target samples in different modalities; and perform learning training on the plurality of target samples in different modalities to obtain the multi-modal task processing system, or, obtain the data processing component.

In some embodiments, the training module is configured to: randomly determine, among a plurality of training samples, a plurality of target samples in different modalities; or acquire a sample scale parameter for determining a plurality of target samples in different modalities, and determine, based on the sample scale parameter, a plurality of target samples in different modalities among the plurality of training samples.

In some embodiments, after determining the plurality of target samples in different modalities, the processing apparatus may further include a first adjustment module. The first adjustment module is configured to: acquire additional samples through the task representation framework; and add the additional samples to the target samples to obtain the adjusted samples for training of the multi-modal task processing system.

The apparatus for multi-modal multi-task processing shown in FIG. 14 may perform the method of the embodiments shown in FIG. 1 to FIG. 10. For the parts that are not described in detail in this embodiment, reference may be made to the related description of the embodiments shown in FIG. 1 to FIG. 10. For the implementation process and technical effects of the technical solution, reference may be made to the description in the embodiment shown in FIG. 1 to FIG. 10, which will not be repeated here.

Figure 15:
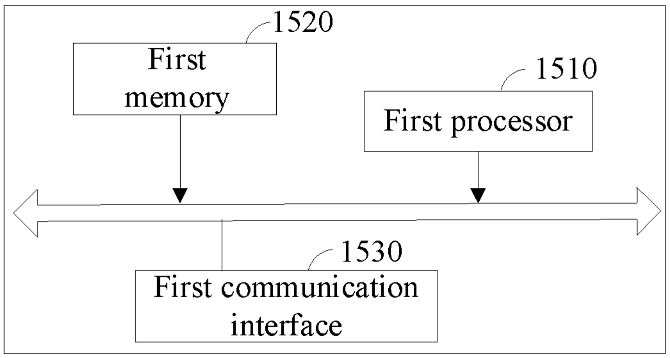
FIG. 15 is a schematic structural diagram of an example electronic device corresponding to the apparatus for multi-modal multi-task processing shown in FIG. 14.

In a possible design, the structure of the apparatus for multi-modal multi-task processing shown in FIG. 15 may be implemented as an electronic device, which may be a cluster server, a conventional server, a cloud server, a cloud host, a virtual center, and the like. As shown in FIG. 15, the electronic device may include: first processor 1510 and first memory 1520. First memory 1520 is configured to store a program for a corresponding electronic device to perform the method for multi-modal multi-task processing provided in the embodiments shown in FIG. 1 to FIG. 10, and first 1510 (which can include one or more processors, such as a CPU working together with a neural network processing unit (NPU)) is configured to execute a program stored in first memory 1520.

The program contains one or more computer instructions. The one or more computer instructions, when executed by first processor 1510, can achieve the following steps: acquiring multiple to-be-processed tasks in different modalities through a task representation framework, where the task representation framework is used to define a content format for describing the to-be-processed tasks; determining an encoding sequence corresponding to each of the to-be-processed tasks; and processing the to-be-processed tasks based on the encoding sequence corresponding to each of the to-be-processed tasks, to obtain a task processing result corresponding to each of the multiple to-be-processed tasks.

In some embodiments, first processor 1510 is further configured to execute all or part of the steps in the embodiments shown in FIG. 1 to FIG. 10. The structure of the electronic device may also include a first communication interface 1530 for the electronic device to communicate with another device or a communication network.

In some embodiments, a computer storage medium for storing computer software instructions used by an electronic device is provided in some embodiments of the present disclosure, which includes involved programs for performing the method for multi-modal multi-task processing in the method embodiments shown in FIG. 1 to FIG. 10.

Some embodiments of the present disclosure provide a computer program product, including a computer program that, when the computer program is executed by a processor of an electronic device, causes the processor to perform the method for multi-modal multi-task processing described in the method embodiments shown in FIG. 1 to FIG. 10.

Figure 16:
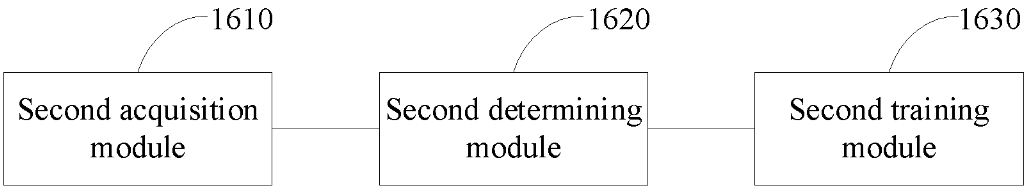
FIG. 16 is a schematic structural diagram of an example training apparatus of a system for multi-modal multi-task processing, according to some embodiments of the present disclosure.

FIG. 16 is a schematic flow chart of a training apparatus of a multi-modal task system according to some embodiments of the present disclosure. With reference to FIG. 16, a training apparatus of a multi-modal task system is provided in the embodiment, which is used for performing the training method of the multi-modal task system shown in FIG. 11. The training apparatus of the multi-modal task system may include a second acquisition module 1610, a second determining module 1620, and a second training module 1630.

Second acquisition module 1610 is configured to acquire multiple training tasks in different modalities through a task representation framework, where the task representation framework is used to define a content format for describing the training tasks, and the multiple training tasks each correspond to a task processing result.

Second determining module 1620 is configured to determine an encoding sequence corresponding to each of the multiple training tasks.

Second training module 1630 is configured to perform learning training based on the encoding sequence corresponding to each of the multiple training tasks to obtain the multi-modal task system for processing the multiple tasks in different modalities.

Figure 11:
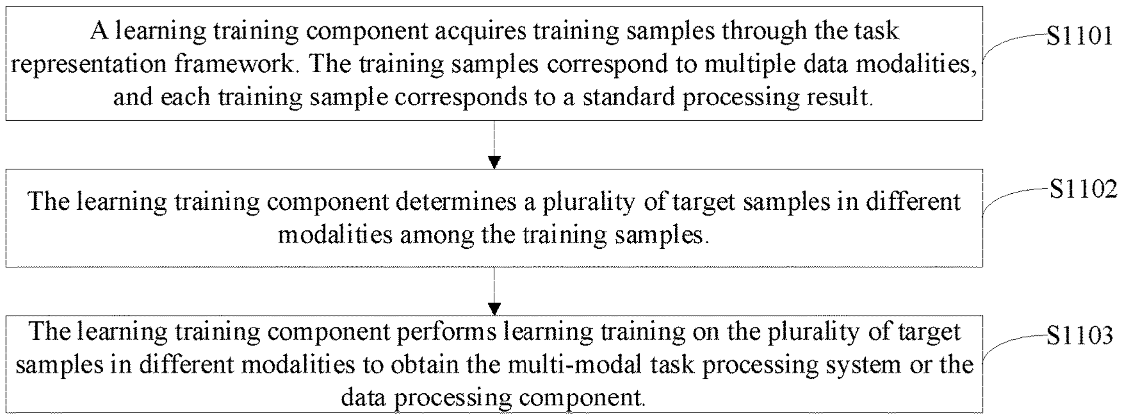
FIG. 11 is a schematic flow chart of obtaining a system for multi-modal multi-task processing, according to some embodiments of the present disclosure.

The apparatus for multi-modal multi-task processing shown in FIG. 16 may perform the method shown in FIG. 11. For the parts that are not described in detail in this embodiment, reference may be made to the related description of the embodiment shown in FIG. 11. For the implementation process and technical effects of the present technical solution, reference may be made to the description in the embodiment shown in FIG. 11, which will not be repeated here.

Figure 17:
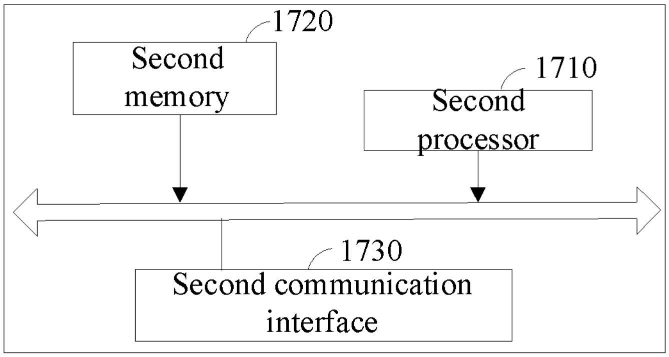
FIG. 17 is a schematic structural diagram of an example electronic device corresponding to the training apparatus of the system for multi-modal multi-task processing shown in FIG. 16.

In a possible design, the structure of the training apparatus for the multi-modal task system shown in FIG. 16 may be implemented as an electronic device, which may be a cluster server, a conventional server, a cloud server, a cloud host, a virtual center, and the like. As shown in FIG. 17, the electronic device may include: second processor 1710 and second memory 1720. Second memory 1720 is used to store a program for a corresponding electronic device to perform the method for multi-modal multi-task processing provided in the embodiment shown in FIG. 11, and second processor 1710 (which can include one or more processors, such as a CPU working together with a neural network processing unit (NPU)) is configured to execute a program stored in second memory 1720.

The program includes one or more computer instructions. The one or more computer instructions, when executed by second processor 1710, can implement the following steps: obtaining multiple training tasks in different modalities through a task representation framework, where the task representation framework is used to define a content format for describing the training tasks, and the multiple training tasks each correspond to a task processing result; determining an encoding sequence corresponding to each of the multiple training tasks; and performing learning training based on the encoding sequence corresponding to each of the multiple training tasks to obtain a multi-modal task system for processing the multiple tasks in different modalities.

In some embodiments, second processor 1710 is further configured to execute all or part of the steps shown in FIG. 11. The structure of the electronic device may also include a second communication interface 1730 for the electronic device to communicate with another device or a communication network.

In some embodiments, a computer storage medium for storing computer software instructions used by an electronic device is provided, which includes involved programs for performing the method for multi-modal multi-task processing in the method embodiment shown in FIG. 11.

Some embodiments of the present disclosure provide a computer program product, including a computer program that, when the computer program is executed by a processor of an electronic device, causes the processor to perform the method for multi-modal multi-task processing described in FIG. 11.

Figure 18:
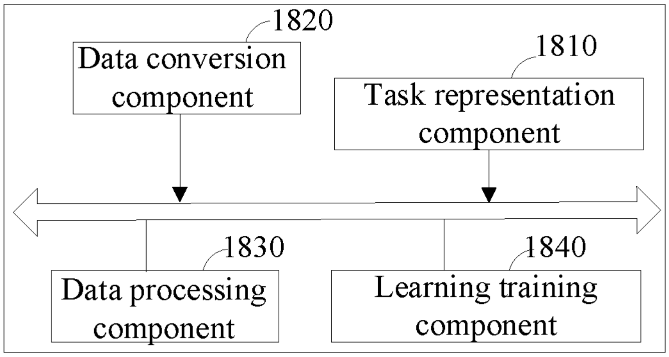
FIG. 18 is a schematic structural diagram of an example system for multi-modal multi-task processing, according to some embodiments of the present disclosure.

FIG. 18 is a schematic structural diagram of a system for multi-modal multi-task processing according to some embodiments of the present disclosure. With reference to FIG. 18, a system for multi-modal multi-task processing is provided. The system for multi-modal multi-task processing includes a task representation component, a data conversion component that is communicatively coupled to the task representation component, and a data processing component that is communicatively coupled to the data conversion component. The system for multi-modal multi-task processing may include a task representation component 1810, a data conversion component 1820, a data processing component 1830, and a learning training component 1840.

Task representation component 1810 includes circuitry configured to acquire multiple to-be-processed tasks in different modalities through a task representation framework, where the task representation framework is used to define a content format for describing the to-be-processed tasks.

Data conversion component 1820 is communicatively coupled to task representation component 1810, and includes circuitry configured to determine an encoding sequence corresponding to each of the to-be-processed tasks.

Data processing component 1830 is communicatively coupled to data conversion component 1820, and includes circuitry configured to process the to-be-processed tasks based on the encoding sequence corresponding to each of the to-be-processed tasks, to obtain a task processing result corresponding to each of the multiple to-be-processed tasks.

In some embodiments, task representation component 1810 includes circuitry configured to: determine a task representation element corresponding to the task representation framework, where the task representation element includes: an element used to define task description information, an element used to define task input information, and an element used to define task output information; and based on the task representation element, obtain the task description information, task input information, and task output information corresponding to each of the multiple to-be-processed tasks in different modalities.

In some embodiments, data conversion component 1820 includes circuitry configured to: acquire all data conversion modules configured to process the to-be-processed tasks; determine, among all data conversion modules, a target conversion module corresponding to each of the to-be-processed tasks; and process the corresponding to-be-processed task using the target conversion module to obtain an encoding sequence corresponding to each of the to-be-processed tasks.

In some embodiments, when data conversion component 1820 processes the corresponding to-be-processed task using the target conversion module to obtain an encoding sequence corresponding to each of the to-be-processed tasks, data conversion component 1820 includes circuitry configured to: acquire the task description information, task input information and task output information corresponding to each of the to-be-processed tasks; process the task description information corresponding to each of the to-be-processed tasks using the target conversion module to obtain a first encoding sequence; process the task input information corresponding to each of the to-be-processed tasks using the target conversion module to obtain a second encoding sequence; process the task output information corresponding to each of the to-be-processed tasks using the target conversion module to obtain a third encoding sequence; and based on the first encoding sequence, the second encoding sequence and third encoding sequence, obtain an encoding sequence corresponding to each of the to-be-processed tasks.

In some embodiments, the system for multi-modal multi-task processing may further include a learning training component 1840. Learning training component 1840 includes circuitry configured to: acquire training samples through the task representation framework, the training samples corresponding to multiple data modalities, each training sample corresponding to a standard processing result; determine, among the training samples, a plurality of target samples in different modalities; and perform learning training on the plurality of target samples in different modalities to obtain the data processing component.

In some embodiments, learning training component 1840 includes circuitry configured to: acquire additional samples through the task representation framework; and add the additional samples to target samples to obtain the adjusted samples used for training of the multi-modal task processing system.

The system for multi-modal multi-task processing shown in FIG. 18 may perform the method shown in FIG. 2. For the parts that are not described in detail in this example, reference may be made to the related description of the embodiment shown in FIG. 2. For the implementation process and technical effects of the present technical solution, reference may be made to the description in the embodiments shown in FIG. 11, which will not be repeated here.

Some embodiments of the present disclosure provide a computer program product, including a computer program that, when the computer program is executed by a processor of an electronic device, causes the processor to perform the steps of the system for multi-modal multi-task processing described in FIG. 18.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A system for multi-modal multi-task processing, comprising:

- a task representation component having circuitry configured to:
  - determine a task representation element corresponding to a task representation framework, wherein the task representation framework is used to define a content format for describing a to-be-processed task and the task representation framework comprises a seq2seq structure task representation framework or a decoder-only structure task representation framework, and the task representation element comprises: an element used to define task description information, an element used to define task input information, and an element used to define task output information; and
  - based on the task representation element, acquire task description information, task input information, and task output information corresponding to each of a plurality of to-be-processed tasks in different modalities, wherein the plurality of to-be-processed tasks comprises at least one of a text task, an image task, an audio task, a vision task, or a table task, and the modalities comprises at least one of a text data modality, an image data modality, an audio data modality, a graph data modality, a video data modality, or a table data modality;
- a data conversion component, communicatively coupled to the task representation component, and having circuitry configured to convert the task description information, the task input information, and the task output information into an encoding sequence corresponding to each of the plurality of to-be-processed tasks, wherein the encoding sequence is an intermedia result executable exclusively by a computing device and not interpretable as human-readable symbols, and the converting is performed by at least one of a text tokenization model, a visual feature extraction model, or an audio feature extraction model; and
- a data processing component, communicatively coupled to the data conversion component, and having circuitry configured to encode each of the plurality of to-be-processed tasks based on the encoding sequence corresponding to each of the plurality of to-be-processed tasks to obtain a task processing result corresponding to each of the plurality of to-be-processed tasks.

2. The system according to claim 1, wherein when the data conversion component having circuitry configured to convert the task description information, the task input information, and the task output information into the encoding sequence corresponding to each of the plurality of to-be-processed tasks, the data conversion component includes circuitry further configured to:

- acquire all data conversion modules configured to process the plurality of to-be-processed tasks;
- determine a target conversion module corresponding to each of the plurality of to-be-processed tasks among all the data conversion modules; and
- process a corresponding to-be-processed task using the target conversion module to obtain an encoding sequence corresponding to each of the plurality of to-be-processed tasks.

3. The system according to claim 2, wherein when the data conversion component having circuitry configured to process the corresponding to-be-processed task using the target conversion module to obtain the encoding sequence corresponding to each of the plurality of to-be-processed tasks, the data conversion module includes circuitry further configured to:

- acquire the task description information, the task input information, and the task output information corresponding to each of the plurality of to-be-processed tasks;
- process the task description information corresponding to each of the plurality of to-be-processed tasks using the target conversion module to obtain a first encoding sequence;
- process the task input information corresponding to each of the plurality of to-be-processed tasks using the target conversion module to obtain a second encoding sequence;
- process the task output information corresponding to each of the plurality of to-be-processed tasks using the target conversion module to obtain a third encoding sequence; and
- based on the first encoding sequence, the second encoding sequence, and the third encoding sequence, obtain the encoding sequence corresponding to each of the plurality of to-be-processed tasks.

4. The system according to claim 1, further comprising a learning training component having circuitry configured to:

- acquire training samples through the task representation framework, the training samples corresponding to a plurality of data modalities, and each training sample corresponding to a standard processing result;
- determine a plurality of target samples in different modalities among the training samples; and
- perform learning training on the plurality of target samples in different modalities to obtain the data processing component.

5. The system according to claim 4, wherein after determining the plurality of target samples in different modalities, the learning training component includes circuitry further configured to:

- acquire an additional sample through the task representation framework; and
- add the additional sample to the plurality of target samples to obtain adjusted samples that are used for training the multi-modal task processing system.

6. A method for multi-modal multi-task processing comprising:

- determining a task representation element corresponding to a task representation framework, wherein the task representation framework is used to define a content format for describing a to-be-processed task and the task representation framework comprises a seq2seq structure task representation framework or a decoder-only structure task representation framework, and the task representation element comprises: an element used to define task description information, an element used to define task input information, and an element used to define task output information;

acquiring, based on the task representation element, the task description information, the task input information and the task output information corresponding to each of a plurality of to-be-processed tasks in different modalities, wherein the plurality of to-be-processed tasks comprises at least one of a text task, an image task, an audio task, a vision task, or a table task, and the modalities comprises at least one of a text data modality, an image data modality, an audio data modality, a graph data modality, a video data modality, or a table data modality;

converting the task description information, the task input information, and the task output information into an encoding sequence corresponding to each of the plurality of to-be-processed tasks, wherein the encoding sequence is an *intermedia* result executable exclusively by a computing device and not interpretable as human-readable symbols, and the converting is performed by at least one of a text tokenization model, a visual feature extraction model, or an audio feature extraction model; and encoding each of the plurality of to-be-processed tasks based on the encoding sequence corresponding to each of the plurality of to-be-processed tasks, to obtain a task processing result corresponding to each of the plurality of to-be-processed tasks.

7. The method according to claim 6, wherein converting the task description information, the task input information, and the task output information into the encoding sequence corresponding to each of the plurality of to-be-processed tasks further comprises:

acquiring all data conversion modules configured to process the plurality of to-be-processed tasks;

determining a target conversion module corresponding to each of the plurality of to-be-processed tasks among all the data conversion modules; and processing a corresponding to-be-processed task using the target conversion module to obtain an encoding sequence corresponding to each of the plurality of to-be-processed tasks.

8. The method according to claim 7, wherein determining the target conversion module corresponding to each of the plurality of to-be-processed tasks among all the data conversion modules further comprises:

acquiring a data modality corresponding to each of the plurality of to-be-processed tasks; and detecting whether an adaptive conversion module that matches the data modality exists among all the data conversion modules;

when the adaptive conversion module that matches the data modality exists, determining the adaptive conversion module as the target conversion module configured to process the to-be-processed task corresponding to the data modality.

9. The method according to claim 8, further comprising:

when an adaptive conversion module that matches the data modality does not exist among all the data conversion modules, generating an adaptive conversion module that matches the data modality; and determining the adaptive conversion module as the target conversion module configured to process the to-be-processed task corresponding to the data modality.

10. The method according to claim 7, wherein processing the corresponding to-be-processed task using the target conversion module to obtain the encoding sequence corresponding to each of the plurality of to-be-processed tasks further comprises:

acquiring the task description information, the task input information and the task output information corresponding to each of the plurality of to-be-processed tasks;

processing the task description information corresponding to each of the plurality of to-be-processed tasks using the target conversion module to obtain a first encoding sequence;

processing the task input information corresponding to each of the plurality of to-be-processed tasks using the target conversion module to obtain a second encoding sequence;

processing the task output information corresponding to each of the plurality of to-be-processed tasks using the target conversion module to obtain a third encoding sequence; and based on the first encoding sequence, the second encoding sequence and the third encoding sequence, obtaining the encoding sequence corresponding to each of the plurality of to-be-processed tasks.

11. The method according to claim 10, wherein processing the task input information corresponding to each of the plurality of to-be-processed tasks using the target conversion module to obtain the second encoding sequence further comprises:

determining a data type of task input data in the task input information;

in response to the data type being discrete data, processing the task input information corresponding to each of the plurality of to-be-processed tasks using the target conversion module to obtain the second encoding sequence; and in response to the data type being continuous data, acquiring a glossary used for processing the task input data; and processing the task input information corresponding to each of the plurality of to-be-processed tasks using the glossary and the target conversion module to obtain the second encoding sequence.

12. The method according to claim 6, further comprising:

acquiring training samples through the task representation framework, the training samples corresponding to a plurality of data modalities, and each training sample corresponding to a standard processing result;

determining a plurality of target samples in different modalities among the training samples; and performing learning training on the plurality of target samples in different modalities.

13. An apparatus comprising:

a memory configured to store instructions; and one or more processors configured to execute the instructions to cause the apparatus to perform operations for multi-modal multi-task processing, wherein the operations comprise:

determining a task representation element corresponding to a task representation framework, wherein the task representation framework is used to define a content format for describing a to-be-processed task and the task representation framework comprises a seq2seq structure task representation framework or a decoder-only structure task representation framework, and the task representation element comprises: an element used to define task description information, an element used to define task input information, and an element used to define task output information;

acquiring, based on the task representation element, the task description information, the task input information and the task output information corresponding to each of a plurality of to-be-processed tasks in different modalities, wherein the plurality of to-be-processed tasks comprises at least one of a text task, an image task, an audio task, a vision task, or a table task, and the modalities comprises at least one of a text data modality, an image data modality, an audio data modality, a graph data modality, a video data modality, or a table data modality;

converting the task description information, the task input information, and the task output information into an encoding sequence corresponding to each of the plurality of to-be-processed tasks, wherein the encoding sequence is an *intermedia* result executable exclusively by a computing device and not interpretable as human-readable symbols, and the converting is performed by at least one of a text tokenization model, a visual feature extraction model, or an audio feature extraction model; and encoding each of the plurality of to-be-processed tasks based on the encoding sequence corresponding to each of the plurality of to-be-processed tasks, to obtain a task processing result corresponding to each of the plurality of to-be-processed tasks.

14. The apparatus according to claim 13, wherein converting the task description information, the task input information, and the task output information into the encoding sequence corresponding to each of the plurality of to-be-processed tasks further comprises:

acquiring all data conversion modules configured to process the plurality of to-be-processed tasks;

determining a target conversion module corresponding to each of the plurality of to-be-processed tasks among all the data conversion modules; and processing a corresponding to-be-processed task using the target conversion module to obtain an encoding sequence corresponding to each of the plurality of to-be-processed tasks.

15. The apparatus according to claim 14, wherein determining the target conversion module corresponding to each of the plurality of to-be-processed tasks among all the data conversion modules further comprises:

acquiring a data modality corresponding to each of the plurality of to-be-processed tasks; and detecting whether an adaptive conversion module that matches the data modality exists among all the data conversion modules;

when the adaptive conversion module that matches the data modality exists, determining the adaptive conversion module as the target conversion module configured to process the to-be-processed task corresponding to the data modality.

16. The apparatus according to claim 15, wherein the operations further comprise:

when an adaptive conversion module that matches the data modality does not exist among all the data conversion modules, generating an adaptive conversion module that matches the data modality; and determining the adaptive conversion module as the target conversion module configured to process the to-be-processed task corresponding to the data modality.

17. The apparatus according to claim 14, wherein processing the corresponding to-be-processed task using the target conversion module to obtain the encoding sequence corresponding to each of the plurality of to-be-processed tasks further comprises:

acquiring the task description information, the task input information and the task output information corresponding to each of the plurality of to-be-processed tasks;

processing the task description information corresponding to each of the plurality of to-be-processed tasks using the target conversion module to obtain a first encoding sequence;

processing the task input information corresponding to each of the plurality of to-be-processed tasks using the target conversion module to obtain a second encoding sequence;

processing the task output information corresponding to each of the plurality of to-be-processed tasks using the target conversion module to obtain a third encoding sequence; and based on the first encoding sequence, the second encoding sequence and the third encoding sequence, obtaining the encoding sequence corresponding to each of the plurality of to-be-processed tasks.

18. The apparatus according to claim 17, wherein processing the task input information corresponding to each of the plurality of to-be-processed tasks using the target conversion module to obtain the second encoding sequence further comprises:

determining a data type of task input data in the task input information;

in response to the data type being discrete data, processing the task input information corresponding to each of the plurality of to-be-processed tasks using the target conversion module to obtain the second encoding sequence; and in response to the data type being continuous data, acquiring a glossary used for processing the task input data; and processing the task input information corresponding to each of the plurality of to-be-processed tasks using the glossary and the target conversion module to obtain the second encoding sequence.

19. The apparatus according to claim 13, wherein the operations further comprise:

acquiring training samples through the task representation framework, the training samples corresponding to a plurality of data modalities, and each training sample corresponding to a standard processing result;

determining a plurality of target samples in different modalities among the training samples; and performing learning training on the plurality of target samples in different modalities.

* * * * *